US009127972B2

(12) United States Patent
Dankowicz et al.

(10) Patent No.: US 9,127,972 B2
(45) Date of Patent: Sep. 8, 2015

(54) SELF-CALIBRATING MASS FLOW SENSOR SYSTEM

(75) Inventors: Harry Dankowicz, Champaign, IL (US); Ryan E. Reinke, Chicago, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1015 days.

(21) Appl. No.: 13/247,016

(22) Filed: Sep. 28, 2011

(65) Prior Publication Data

US 2013/0080079 A1    Mar. 28, 2013

(51) Int. Cl.
*G01F 1/00* (2006.01)
*G01F 1/30* (2006.01)
*G01F 25/00* (2006.01)
*G01F 1/76* (2006.01)

(52) U.S. Cl.
CPC .. *G01F 1/30* (2013.01); *G01F 1/76* (2013.01); *G01F 25/0007* (2013.01)

(58) Field of Classification Search
CPC .......... G01F 1/30; G01F 1/76; G01F 25/0007
USPC .......................................................... 702/45
See application file for complete search history.

(56) References Cited

U.S. PATENT DOCUMENTS

| | | | |
|---|---|---|---|
| 5,369,603 A * | 11/1994 | Myers | 702/86 |
| 5,708,366 A | 1/1998 | Nelson | |
| 5,837,906 A | 11/1998 | Palmer | |
| 6,367,336 B1 * | 4/2002 | Martina et al. | 73/861.74 |
| 6,734,968 B1 | 5/2004 | Wang et al. | |
| 6,948,508 B2 | 9/2005 | Shajii et al. | |
| 7,029,444 B2 | 4/2006 | Shin et al. | |
| 7,062,397 B1 | 6/2006 | Minor | |
| 7,409,871 B2 | 8/2008 | Wang et al. | |

OTHER PUBLICATIONS

Reinke, R., et al., "A Dynamic Grain Flow Model for a Mass Flow Yield Sensor on a Combine", Precision Agriculture (2011) 12:732-749.
Reinke, R., et al., "Modeling and Calibration of Combine, Impact Plate, Yield Sensors", SAE Int. J. Commer. Veh., vol. 3, Issue 1, pp. 241-249, published Oct. 2010.
Reinke, R., "Self-Calibrating Mass Flow Sensor", Thesis, Submitted in partial fulfillment of the requirements for the degree of Master of Science in Mechanical Engineering in the Graduate College of the University of Illinois at Urbana-Champaign, published Nov. 7, 2011.
Reyns, P., et al., "A Review of Combine Sensors for Precision Farming", Precision Agriculture, 3, 169-182, 2002.

* cited by examiner

*Primary Examiner* — Janet Suglo
(74) *Attorney, Agent, or Firm* — Greer, Burns & Crain, Ltd.

(57) ABSTRACT

Method and system for calibrating a mass flow sensor. The mass flow sensor includes an impact sensor that receives an impact force due to collisions with a plurality of solid particles to generate an output signal. A model relates a mass flow input to the output signal. At least one measurable parameter is varied over a plurality of samples by varying a physical component of the mass flow sensor, and a generated output signal is received. The model can be calibrated based on the received output signal for each of the plurality of samples. A mass-flow input can also be estimated while simultaneously updating the model.

37 Claims, 13 Drawing Sheets

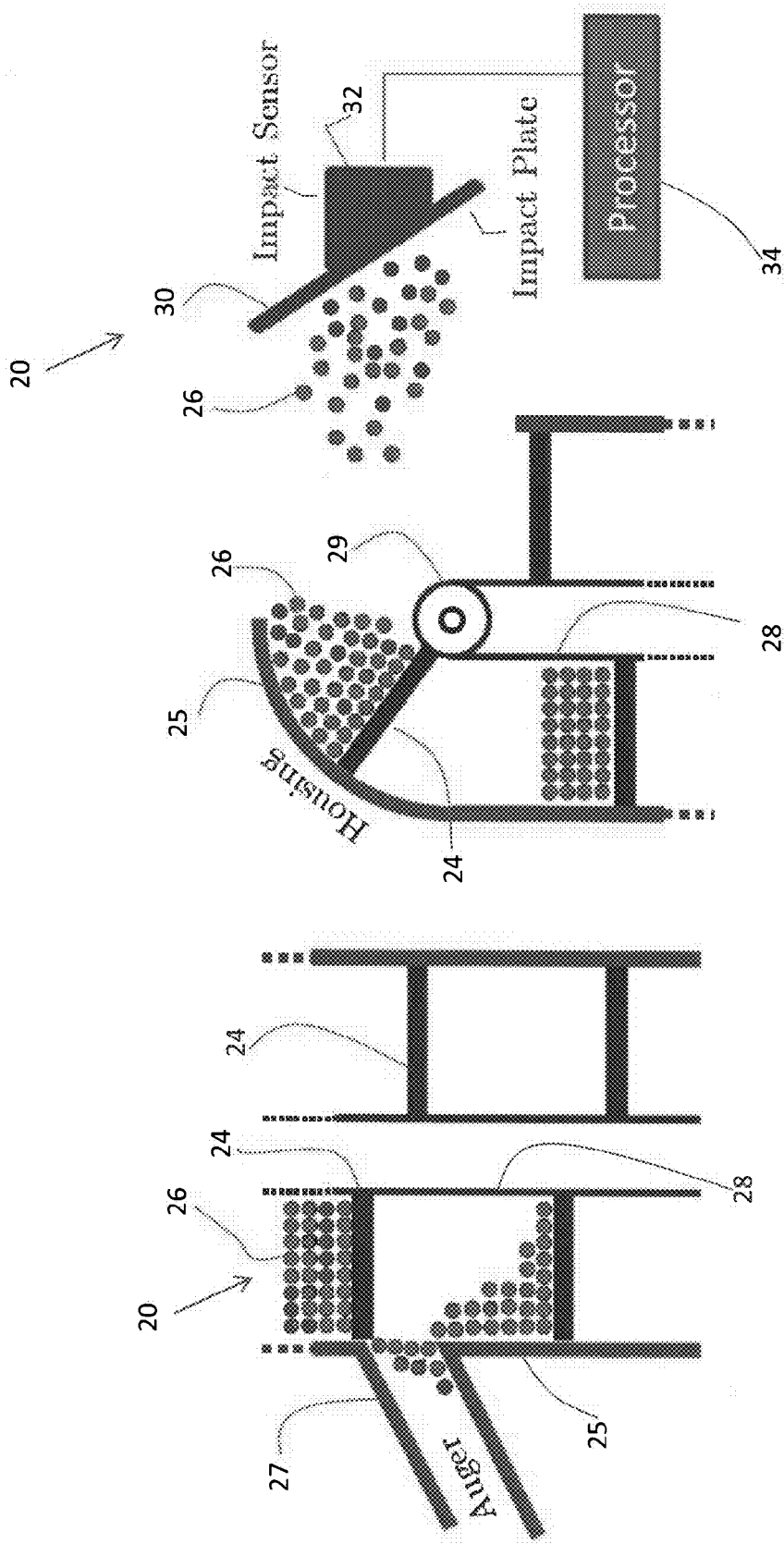

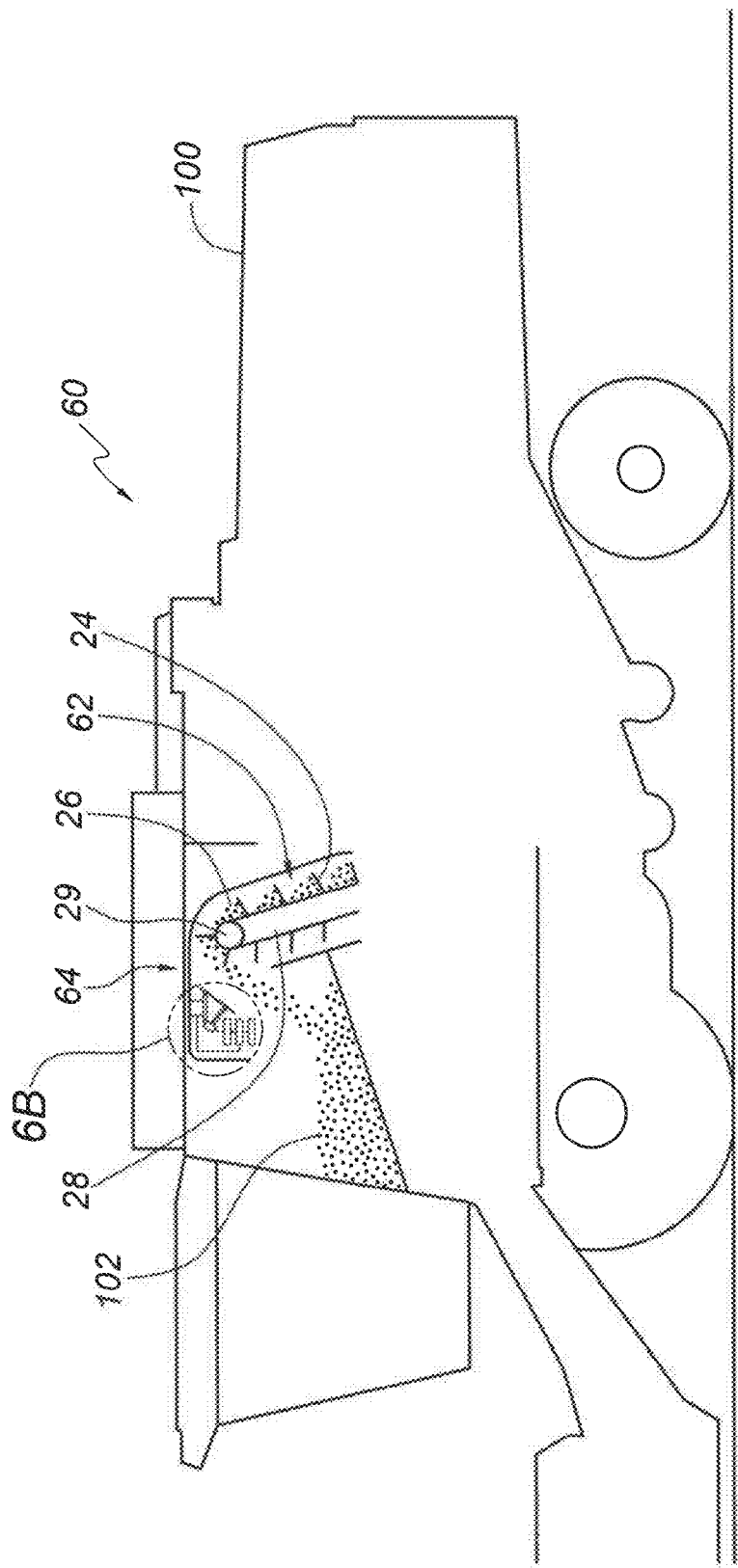

SELF-CALIBRATING MASS FLOW SENSOR SYSTEM

FIELD OF THE INVENTION

The invention relates generally to the field of agricultural equipment and methods.

BACKGROUND OF THE INVENTION

Several systems and methods can be implemented to monitor mass flow of solid particles, such as grain, through a combine. Monitoring mass flow is useful for yield monitoring and evaluating harvesting areas, among many other uses.

Flow sensors are typically grouped into volumetric flow sensors, mass flow sensors, and indirect measurement devices. Volumetric flow sensors include paddlewheels and optical devices mounted in a clean grain elevator. Mass flow measurement devices include impact sensors, torque sensors mounted on elevator paddles, torque sensors mounted on the clean grain elevator drive shaft, diaphragm impact sensors, pivoted-auger-fed devices, and scales for weighing of the clean grain auger. Indirect methods of flow sensing include use of capacitive sensors, ultrasonic sensors, and x-ray measurement principles.

Many state-of-the-art commercial implementations rely on impact-type sensors and empirical relations between measured, time-averaged values of the impact force and the corresponding time-averaged rates of mass flow over typical sample periods. For example, a method for measuring mass flow rate in grain combines during harvesting employs impact mass flow sensors mounted in the clean grain elevators of the combines. Systems using mass flow sensors rely on the direct interaction of grains with an impact plate to accomplish mass flow rate estimation. An example impact sensor includes an impact plate and a force transducer that converts the time-averaged impact force into a voltage signal. Such impact-type sensors can be relatively simple structures that allow for independent operation and reduced risk for material build-up.

An example impact-based mass-flow sensor system 20 for a combine 22 is shown in FIGS. 1-2. Portions of FIGS. 1-2 are reprinted with permission from Reinke, R., Dankowicz, H., Phelan, J., Kang, W., (2011), Precision Agriculture 12:732-749, © Springer Science+Business Media, LLC, 2011. In the example system 20, disposed within a clean grain elevator, elevator paddles 24 disposed within a housing 25 are filled with solid particles (e.g., grain particles) 26 that enter via an input such as an auger 27 (shown in FIG. 1) that provides an input path to the system 20. The elevator paddles 24, disposed in the input path to receive the particles, are attached to a chain 28 that is cycled by a rotating sprocket 29 (shown in FIG. 2). As the paddles 24 move in an angular fashion, e.g., rotate around the sprocket 29, the solid particles 26 are propelled towards an impact plate 30. As momentum is lost in the subsequent collision between a plurality of the solid particles 26 (the amount of which may be equal to or less than all of the particles that enter the system 20) and the impact plate 30, an effective force is measured on the impact plate, due to internal deformations in the sensor, as a change in voltage of a force transducer 32. The signal from the force transducer 32 is sent to a processor 34 coupled to the force transducer via suitable signal (e.g., electrical) connections, such that the signal represents a measured force on the impact plate 30. This measured force, time-averaged over some typical sample period, along with knowledge of the dynamics of the system 20, allows for the corresponding time-averaged mass flow rate of the solid particles 26 to be estimated.

Typically, curve-fit schemes are used to characterize the relation between the time-averaged impact force and the time-averaged rate of particle mass flow during typical sample periods. During calibration, the relationship between the time-averaged impact force and the time-averaged rate of particle mass flow can be updated. However, such curve-fit schemes are highly dependent on the conditions at which calibration is performed. For instance, significant errors can result in estimating time-averaged mass flow rates at a certain threshold above calibration flow rates, and increased errors can also occur for low flow rates.

Simple linear models have been employed in the art to relate the time-averaged rate of mass flow and the time-averaged impact force received by the impact plate. However, example combine operations exhibit a strongly nonlinear dependence of the time-averaged impact force on the time-averaged rate of mass flow at larger flow rates. Nonlinear, model-based designs have been proposed in the art for mass flow sensors to account for changes in material properties.

A challenge to a practical implementation of such nonlinear models is the lack of knowledge of model parameters that characterize the grain behavior. Such model parameters include, as nonlimiting examples, effective coefficients of friction and restitution and their dependence on particle moisture levels. Similarly, mechanical aging of system components, such as (but not limited to) the elevator paddles 24, affects the values and physical interpretation of model parameters. Similar difficulties arise in the use of empirical models in which model coefficients lack physical origin.

As a result, repeated in-field calibration of a conventional mass-flow sensor system is typically required to reset model parameters for conditions of operation. Combine operators are often relied upon to initiate the calibration task. Currently, an adequate calibration of such a sensor relies on a combine operator making several (here at least three in order to calibrate three model parameters) passes of the combine across a section of a crop, recording the time-averaged sensor output during that time, and subsequently weighing the harvested crop during that time to determine the time-averaged mass flow rate. An ideal calibration procedure requires many more than three passes of the combine in order to achieve greater statistical strength in the measurements.

This example calibration procedure results in a relationship between the time-averaged output of the mass flow sensor and the time-averaged mass flow rate of the grain during the time interval of harvesting. This can be visualized as a 2-D graph with discrete points characterized by the sensor output (plotted on the x-axis) and the mass flow rate (plotted on the y-axis). Calibration is then accomplished by fitting a polynomial to these discrete data points in order to characterize the relationship between the time-averaged output of the sensor and the time-averaged mass flow rate.

The above-described procedure has several drawbacks. For example, the process is time-consuming and costly for the combine operator. Additionally, it is unlikely that combine operators will perform a multitude of combine passes to achieve several different collections of time-averaged mass flow rate and time-averaged sensor output values. Furthermore, this calibration procedure must be repeated each time there is a change in crop conditions (e.g., moisture, grain type, grain variety). This also relies on the ability of the combine operator to recognize these changes taking place and to subsequently take action to re-calibrate the system to remedy the effects of these changes.

Additionally, the passes of the combine that are made across crops to facilitate the calibration procedure should be made across sections of crops that will collectively yield a wide range of time-averaged mass flow rates (i.e., a distinct time-averaged mass flow rate for each pass that is representative of the instantaneous mass flow rates during the pass but that differs in value from the other passes made). If passes are made across crops that collectively yielded only a small range or cluster of time-averaged mass flow rates, the polynomial fit will be inadequate, will not have great statistical strength, and will not be representative of all operating conditions. This will likely lead to mass flow rate estimation errors when operating the combine over sections of crops that exhibit yields outside the range in which calibration was performed.

The calibration procedure only identifies model parameters that describe the relationship between the time-averaged sensor outputs and time-averaged mass flow rates across a significant duration of time, namely the entire time interval of harvesting across some section of crop, say on the order of tens of minutes. The extent to which this is applicable to the relationship between the time-averaged sensor outputs and time-averaged mass flow rates during much shorter sample periods depends on the statistical distribution of mass flow rates during the run. As such information is typically not available, the calibrated model is instead assumed to be valid also across the sample periods typical of the mass-flow sensing system during real-time operation, say on the order of seconds.

SUMMARY OF THE INVENTION

Embodiments of the present invention provide, among other things, a method and system for calibrating a mass flow sensor for estimating a mass flow of solid particles. The mass flow sensor includes an impact sensor that receives an impact force due to collisions with a plurality of the solid particles as the solid particles flow through the mass flow sensor system to generate an output signal.

In an example method, a model is provided that relates a mass flow input to the sensor output, where the model includes at least one internal parameter and at least one measurable parameter. The at least one measurable parameter is varied over a plurality of samples by varying a physical component of the mass flow sensor. For each of the plurality of samples, the generated sensor output is received. A mass flow input is estimated and the model is updated simultaneously by updating the at least one internal parameter based on the received sensor output for each of the plurality of samples, and the varied measurable parameter for each of the plurality of samples.

BRIEF DESCRIPTION OF THE DRAWINGS

FIG. 1 shows an example mass flow in a clean grain elevator of a combine;

FIG. 2 shows another stage of grain flow;

FIGS. 6A-6B show an example combine including a mass flow sensor system according to an embodiment of the present invention;

DETAILED DESCRIPTION

A portion of the disclosure of this patent document contains material which is subject to copyright protection. The copyright owner has no objection to the facsimile reproduction by any one of the patent document or the patent disclosure, as it appears in the Patent and Trademark Office patent file or records, but otherwise reserves all copyright rights whatsoever.

Those of ordinary skill in the art will appreciate that good calibration is essential for optimal performance of a mass flow or yield monitoring system. However, known calibration methods for mass flow sensors and yield monitors are inconvenient and prone to error. Such difficulties have been further compounded by the need to calibrate over the entire range of flow rates encountered during harvest and for each type of grain that is to be harvested, as well as the need to recalibrate to account for changes in grain moisture contents or crop conditions or the aging of components of the machine geometry.

Embodiments of the present invention provide methods and systems for calibrating a mass flow sensor for estimating a mass flow of solid particles. Nonlimiting examples of solid particles include grain. An example mass flow sensor includes an impact sensor that receives an impact force due to collisions with a plurality of the solid particles as the solid particles flow through the mass flow sensor to generate a sensor output.

More particular embodiments of the present invention provide a method for automated initial and real-time calibration of a mass flow sensor on a combine, as well as estimation of mass flow of solid particles through the mass flow sensor. These provide a method for inferring the mass flow rate of solid particles (e.g., grain) through a combine via a regression-based algorithm applied to a model that describes the flow of particles through the combine and to update internal parameters that quantify the modeled relationship between mass flow and sensor output. In some example embodiments, the model is updated, and the mass flow rate is inferred, simultaneously. The model can be applied according to embodiments of the present invention in any of several general methods, which can be employed at various times and environments to provide calibration and/or estimation.

Preferred embodiments will now be discussed with respect to the drawings. The drawings include schematic figures that are not to scale, which will be fully understood by skilled artisans with reference to the accompanying description. Features may be exaggerated for purposes of illustration. From the preferred embodiments, artisans will recognize additional features and broader aspects of the invention.

Figure 3:
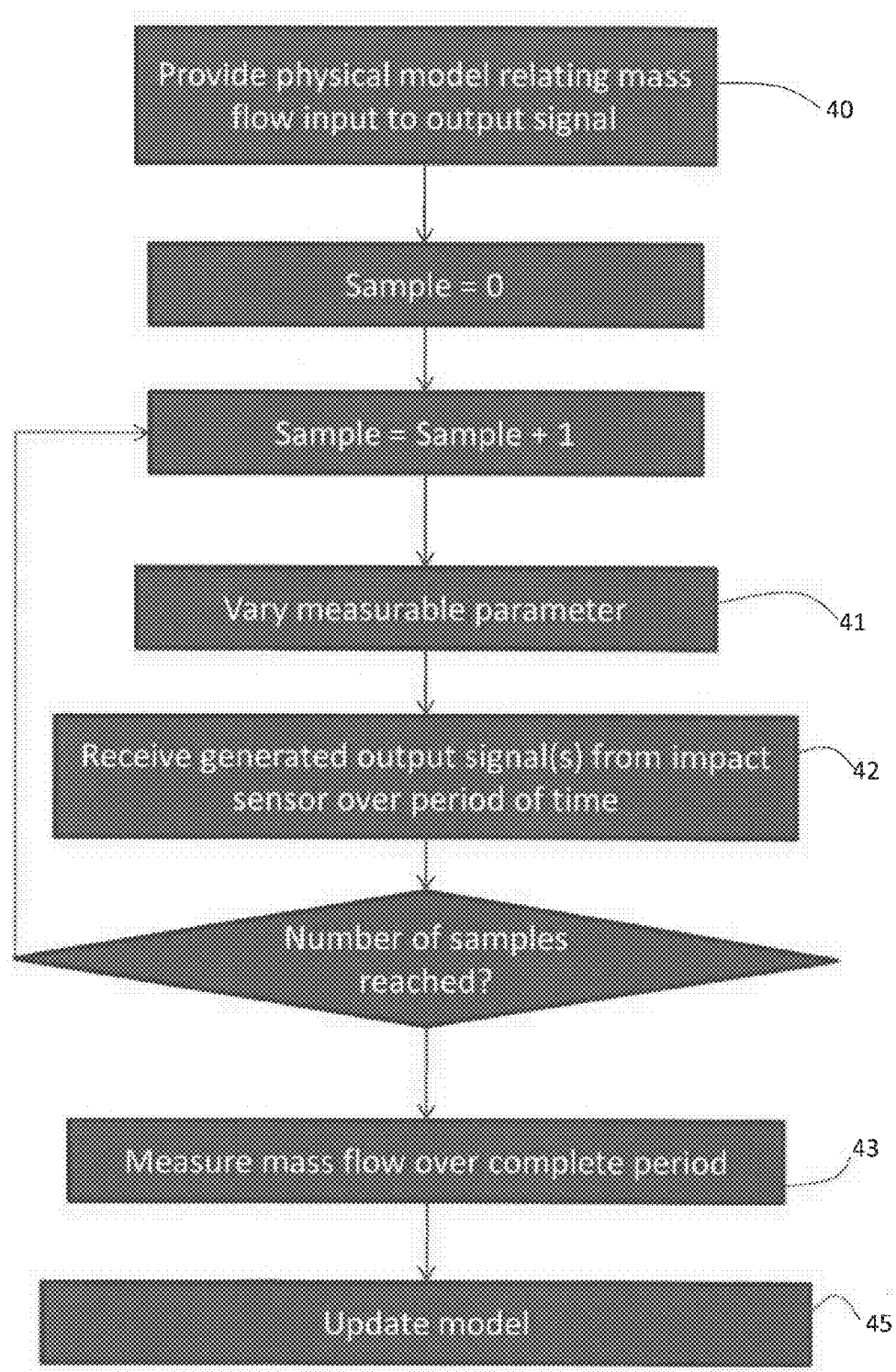
FIG. 3 shows an example method for calibrating a mass flow sensor system according to an embodiment of the present invention.

FIG. 3 shows an example general method for calibrating a mass flow sensor system according to an embodiment of the present invention. In example embodiments, a model is provided (step 40) that relates a mass flow input to the sensor output. This model may be generated in real-time, previously stored and/or updated, input at the beginning of the method, or provided in other ways. Nonlimiting example models include equations, functions, algorithms, physical computational models, and/or other quantitative models relating the mass flow input to the sensor output.

A nonlimiting example model is a physical mathematical model that describes solid particle flow. An example physical model quantifies the relationship between a time-averaged mass flow rate and a time-averaged measured force imparted to an impact plate during some sample period based on associations between inputs and outputs of various stages of the physical process, in which the output of one stage constitutes the input of the immediate subsequent stage. These relationships are composed of elements describing the mechanical properties of the solid particles and the geometric dimensions and operation of the mass flow sensing system.

A particular example model is characterized by, and includes, measurable parameters, whose true values are known (e.g., determined in some way) and, in select cases, controllable; measurable parameters whose values are unknown (but, in principle, knowable); and internal parameters, which represent aggregate properties of the solid particles' interactions with the system components within the combine and with surrounding particles. Nonlimiting examples of internal parameters include mechanical interactions among the solid particles, mechanical interactions between the solid particles and portions of the mass flow sensor, frictional properties of the solid particles, adhesive properties of the solid particles, elastic properties of the solid particles, visco-elastic properties of the solid particles, collisional properties of the solid particles, moisture content of the solid particles, shape of the solid particles, density of the solid particles (including subsets of parameters thereof), and deformations in the machine geometry due to aging. Nonlimiting examples of measurable parameters include kinematics of the mass flow system and geometry of the combine, clean grain elevator, and/or mass flow system (including subsets of parameters thereof—e.g., the geometry of the combine may be characterized by several individual parameters), as well as unknown but measurable parameters including the mass flow rate through the combine. It will be appreciated that example models can include a multitude of combinations of measurable parameters and internal parameters, and that these parameters may additionally or alternatively represent combinations of various parameters. The present invention is not intended to be limited to the specific models disclosed herein nor limited to models having the specific sets of parameters disclosed herein.

Calibration as referred to herein can be thought of as a process whereby one or more internal parameters are estimated from one or more known values of the measurable parameters. Estimation as referred to herein is a process whereby the unknown values of one or more measurable parameters are obtained from one or more known values of the remaining measurable parameters and of the internal parameters. Nonlimiting example embodiments can combine the calibration of internal parameters with the estimation of measurable, unknown parameters.

An example model includes at least one internal parameter and at least one measurable parameter. Preferably, more than one (and more preferably, many) measurable parameter(s) is (are) included in the example model, at least one of which is controllable. According to embodiments of the present invention, this (controllable) measurable parameter is intentionally varied over a plurality of samples (step 41) by controlling a physical component of the mass flow sensor. As a nonlimiting example, altering a portion of the geometry of the combine (which if used for mass flow sensing can be considered a component of the mass flow sensor as used herein), such as the orientation or position of the impact plate, via a suitable selectively controllable actuator provides a measurable parameter (here, a parameter relating to the geometry) that can be varied over several samples (e.g., at various time intervals) to provide different sets of data. Inducing modifications to impact plate orientation as a way to achieve real-time calibration is based in part on an observed strong dependence of the momentum imparted to the impact plate on the orientation of the impact plate.

In an example embodiment, for each of the plurality of samples for a particular calibration process, the generated sensor output from the impact sensor is received (step 42), e.g., by recording the subsequent sensor output (e.g., a time-averaged voltage output) for a (at least relatively) constant mass flow of solid particles. For example, each sample can correspond to a particular impact plate angle. When varying the measurable parameter (e.g., the angle of the impact plate), the other parameters are either kept constant or are known or calculable or, in the case of the mass flow input, assumed to be accurately represented by its time-averaged value.

A sensor output sample provides a representative value (or set of values) for one or more, and preferably several, received instantaneous impact force readings over a determined (e.g., predetermined or determined during performance of the method) period of time. A nonlimiting period of time for a sample is one second (i.e., samples are collected at 1 Hz). During a particular sample period, the sensor is impacted by the solid particles one or several times. The rate of impact can be affected by, as a nonlimiting example employing the sensor system 20 of FIGS. 1-2, the frequency of the elevator paddles 24 depositing (e.g., propel) the solid particles onto the impact plate 30. Such a frequency can in turn be affected by the rotational frequency of the sprocket 29. A nonlimiting example frequency for propelling solid particles towards the impact plate 30 is about 13 times/second. The rate at which the solid particles impact the sensor in preferred methods is different than the frequency in which instantaneous impact force readings are received, and further, the instantaneous impact force readings preferably are received at a higher frequency than the rate at which the solid particles are deposited on the impact plate. A nonlimiting example frequency for receiving instantaneous impact force readings is 1 kHz. The plural impact force readings over the sampling period (e.g., 1000 readings for a 1 kHz force reading frequency and a 1 Hz sample frequency) are combined (e.g. averaged) to provide a sample. The sensor outputs may be, as nonlimiting examples, received (and in some example embodiments filtered, smoothed, amplified, and/or processed as needed) outputs. In a nonlimiting example method, a received output voltage can be multiplied by a conversion factor $$\left(\text{e.g., } 0.4448 \frac{N}{mV}\right.$$

for an example mass flow sensor) to provide a particular instantaneous impact force reading, and these plural impact forces can be combined over a particular sampling period to provide an average impact plate force over that sampling period.

The time-averaged mass flow is measured (step 43) over the period during which the measurable parameter is varied (i.e., step 41). The generated sensor output and the varied measurable parameter(s) provide a set of data for each of the plurality of samples, and these data sets along with the measured time-averaged mass flow (step 43) are in turn used to update the model (step 45) by updating the at least one internal parameter in the model. Nonlimiting example data sets include the impact plate orientation, the sensor output, and the measured time-averaged mass flow, and may include other measurable parameters. These data sets allow estimation of the internal model parameters to enable agreement between the measured time-averaged impact force (from step 42) and the predicted time-averaged impact force from the physics-based model (from step 40), given input pairs of varied measurable parameters (from step 41), time-averaged mass flow rate (from step 43), and (known) machine geometric parameters.

Nonlimiting example methods use a processor to perform a nonlinear regression analysis on the model (which may be, e.g., a computable algorithmic model) using the sets of data to optimize the internal parameters. This nonlinear regression analysis may include, as a nonlimiting example, a least-squares function. Regression can be applied to infer the values of the model's internal parameters that characterize the predicted dependence of the sensor output to the varied measurable parameter. While these parameters are inferred from changing the measurable parameter, they also capture the predicted dependence of the sensor output on the mass flow input. For example, if the varied parameter is the orientation of the impact plate, inferring parameters from sweeping the impact plate angle can also infer a relationship between time-averaged mass flow rate and the sensor output, representing a time-averaged impact force.

In an example initial calibration method, the mass flow input can be measured (step 43) using known measurement methods apparent to those of ordinary skill in the art. The model is then updated (step 45) by updating the at least one internal parameter. Thus, a particular example method of calibration can be accomplished by cycling a known and steady mass flow rate of the particles through the combine, and thus receiving a plurality of sensor output readings (step 42) while simultaneously sweeping the impact plate angle (step 41). As a nonlimiting example, the impact plate angle is varied between 40° and 90°.

Figure 4:
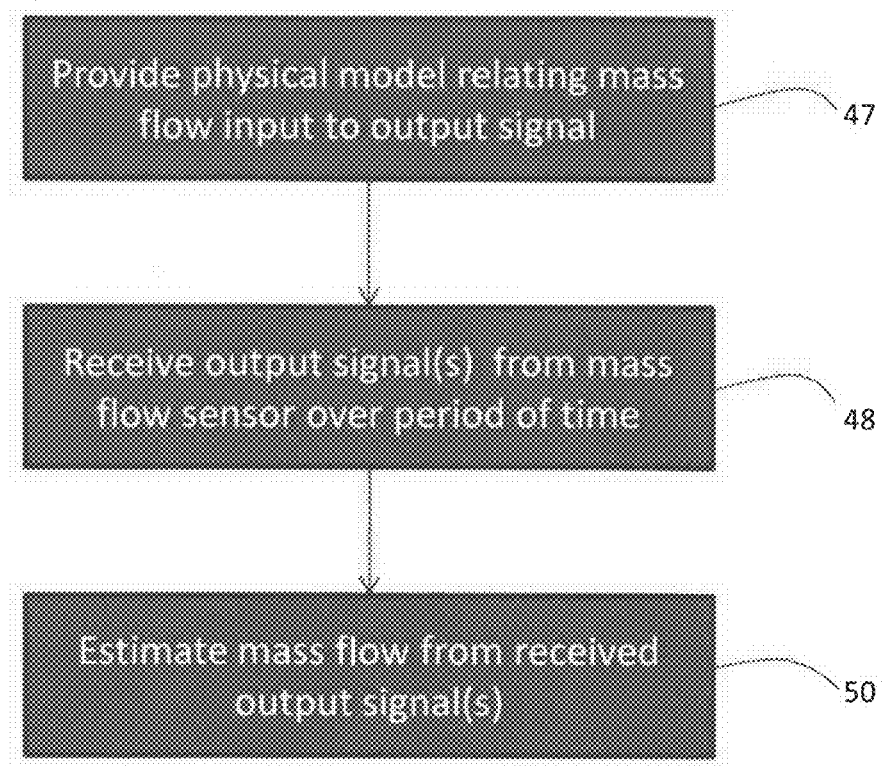
FIG. 4 shows an example method for open-loop estimation using a mass flow sensor system, according to an embodiment of the present invention.

FIG. 4 shows an example method for estimation, which generally estimates time-averaged mass flow rate during a typical sample period, given values for internal model parameters, impact forces, and machine geometric parameters. This example estimation method, referred to in example embodiments as open-loop estimation, can be employed using a mass flow sensor that has been calibrated according to the method shown in FIG. 3. The open-loop estimation method can be performed in a harvesting environment.

Generally, in the open-loop estimation method, a model is provided (step 47) that relates a mass flow input to a sensor output. This model includes at least one internal parameter and at least one measurable parameter. Nonlimiting example models, including examples of internal parameters and measurable parameters, include those described above and elsewhere by example herein. Preferably, the model is an updated model from the calibration method shown in FIG. 3 (i.e., from step 45). A new sensor output constituting a time-averaged impact force during a typical sample period (step 48) generated by the mass flow sensor is received. The mass flow input is estimated (step 50) using the received new generated sensor output and the provided model. As a nonlimiting example, a bisection algorithm can be used to solve for the estimated mass flow input given the provided model and a time-averaged impact force output from the received new sensor output. Using the example open-loop estimation method, the time-averaged mass flow rate during a typical sample period can be estimated in the harvesting environment using an updated (calibrated) model.

An additional estimation method, referred to herein as closed-loop estimation (FIG. 5), both estimates mass flow given a sensor output and calibrates a model such as those described above or elsewhere herein. This particular estimation method is particularly useful for self-calibration of the mass flow sensor system, for instance where conditions for the solid particles are likely to have changed (as a nonlimiting example, moisture conditions). Closed-loop estimation generally includes intentionally introducing known variations in measurable parameters, preferably machine parameters, to generate a sample of measured time-averaged impact forces, while model parameters and mass flow rate remain relatively constant, in order to simultaneously estimate values for internal model parameters and mass flow rate.

Figure 5:
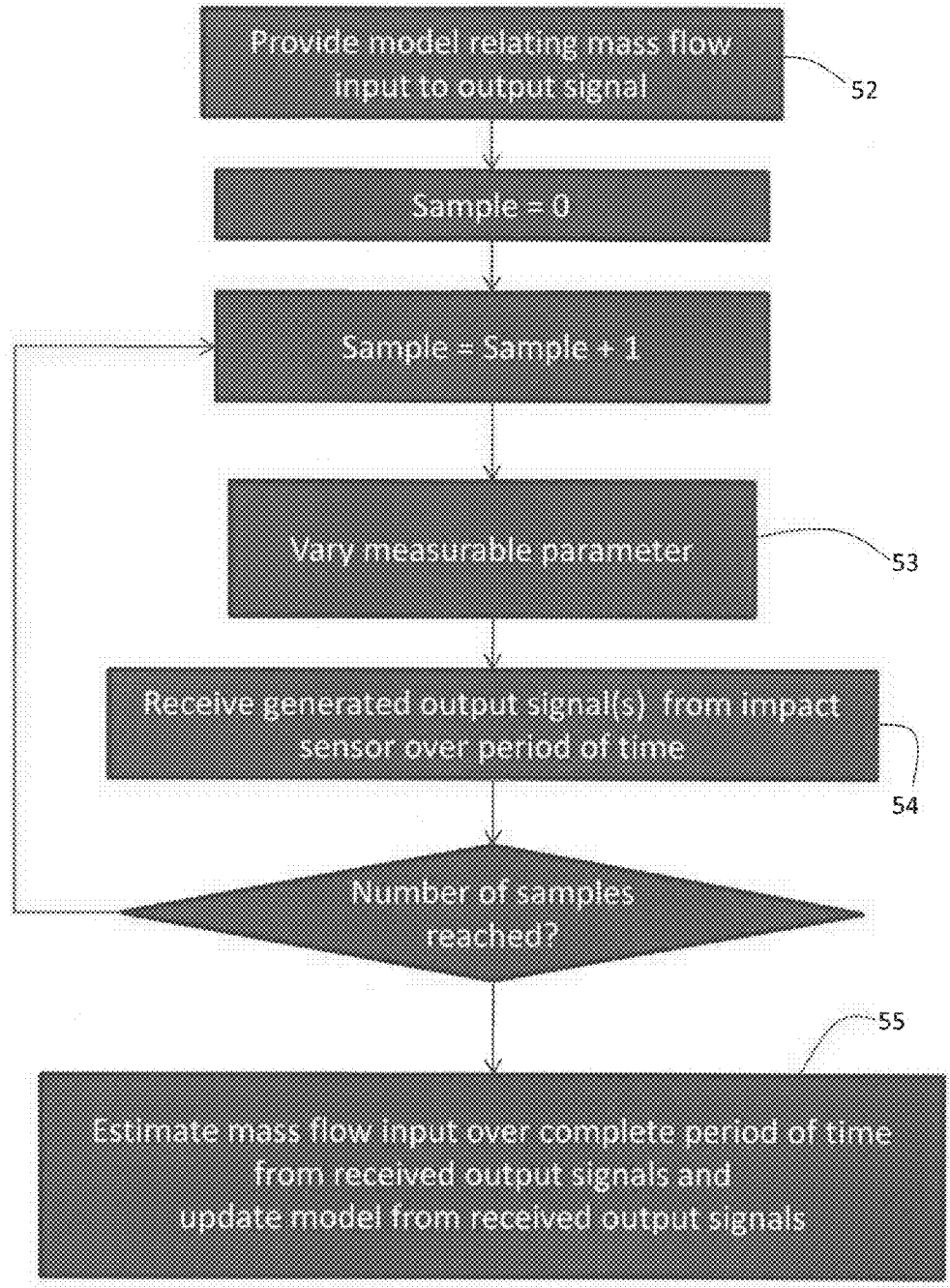
FIG. 5 shows an example method for closed-loop estimation using a mass flow sensor system, according to an embodiment of the present invention.

In an example closed-loop estimation method, shown in FIG. 5, a model is provided (step 52) relating a mass flow input to a sensor output. Example models including the models (and internal and measurable parameters) described herein. Preferred models (and internal and measurable parameters) include models updated from a previous inventive method, such as but not limited to the calibration method shown in FIG. 3, or a previously-performed closed-loop estimation method. Thus, the at least one internal parameter in the provided model can be, as a nonlimiting example, derived from an earlier calibration (e.g., a best guess from an earlier performed method) or otherwise provided as an input to the model.

As with the calibration method in FIG. 3, the measurable parameter is varied over a plurality of samples (step 53) by controlling a physical component of the mass flow sensor. This can be performed, for instance, using the methods described above for calibration, or as otherwise described herein. For each of the plurality of samples, a generated sensor output constituting a time-averaged impact force during a typical sample period is received (step 54) from the mass flow sensor, similar to the calibration and estimation methods described above for FIGS. 3 and 4.

The mass flow input is estimated (step 55) by using the provided model (step 52), the varied measurable parameter for each of the plurality of samples (step 53), and the received sensor output for each of the plurality of samples (step 54). Preferably simultaneously, the internal parameters for the model also are updated (step 55) using the varied measurable parameter for each of the plurality of samples (step 53), and the received sensor output for each of the plurality of samples (step 54). In a nonlimiting example method, a nonlinear regression analysis (e.g., a least-squares analysis) is performed on the provided model. The varied measurable parameter and the received sensor output for each of the plurality of samples provide sets of data that can be used for the example nonlinear regression analysis for estimating both the mass flow rate and the (to-be-updated) model parameters.

As with the initial calibration method described above, the combined estimation and calibration can be accomplished in an example embodiment by sweeping the impact plate angle. As a result of regression analysis, mass flow rate can then be estimated while simultaneously updating the other parameters of the model to reflect changing conditions of particles (e.g., grain).

The open-loop estimation process shown in FIG. 4 can be subsequently used to estimate mass flow when provided with a model (e.g., in step 47) updated by the closed-loop estimation method shown in FIG. 5. Thus, the example (initial) calibration method, closed-loop estimation, and open-loop estimation can be selected and performed as needed to estimate mass flow, even in a harvesting environment (e.g., in a field) and even given changing conditions.

FIG. 6A shows a combine 60 for use with an example embodiment of the present invention. The combine 60 includes an outer housing 100 containing therein a grain storage area 102. The combine 60 also includes an outer housing 25 having a clean grain elevator 62 disposed therein, and a mass flow sensor 64, more clearly shown in FIG. 6B, according to an embodiment of the present invention.

Components of the example mass flow sensor 64 can be configured similarly to the analogous components shown in FIGS. 1 and 2 (though this is not required in all embodiments), and like parts will thus be identified with like reference characters. In the mass flow sensor 64, the housing 25 includes an input provided in an example by an auger (not shown in FIGS. 6A-6B) defining an input path leading to the housing. The grain elevator 62 is at least partly disposed in the input path for receiving, delivering, and propelling solid particles 26 (e.g., grain) through a portion of the housing 25. Particularly, the example grain elevator 62 includes elevator paddles 24 attached to a chain 28 that is cycled by a rotating sprocket 29. Rotation of the sprocket 29 may controlled via a suitable controller, e.g., a microcontroller.

The example mass flow sensor 64 includes an impact sensor such as impact plate 30, which is disposed relative to the grain elevator 62 and configured to receive impact due to collisions with a plurality of particles of the propelled grain 26. The impact plate 30 is coupled (e.g., mounted) to a force transducer 32, such as but not limited to one or more Hall-effect sensors, strain gauges, piezoelectric sensors (e.g., cantilever beam types or piezo films), pressure sensors, etc., that generates the output signal in response to an impact force on the impact plate.

A selectively operable actuator 80 is coupled (e.g., fixedly coupled, and more preferably mounted) to the impact sensor (e.g., to the impact plate 30) to control a relative configuration of the impact sensor and the grain elevator 62. As nonlimiting examples, the actuator 80 can be a motor, such as but not limited to a servo motor, a servo motor with clutch mechanism, a piston, a piston with spring (if the piston is limited to either push or pull), piezoelectric motor, etc., coupled (e.g., fixedly coupled and more preferably mounted) to a base of the impact plate 30 for reconfiguring the impact plate by changing its orientation or position. Preferably, the actuator 80 includes a signal input for receiving a signal such as via leads 83 coupling the actuator to a controller 86. A nonlimiting example controller 86 is a microcontroller, which can be located anywhere in the mass flow sensor 64 or elsewhere in the combine 60.

Figure 6C:
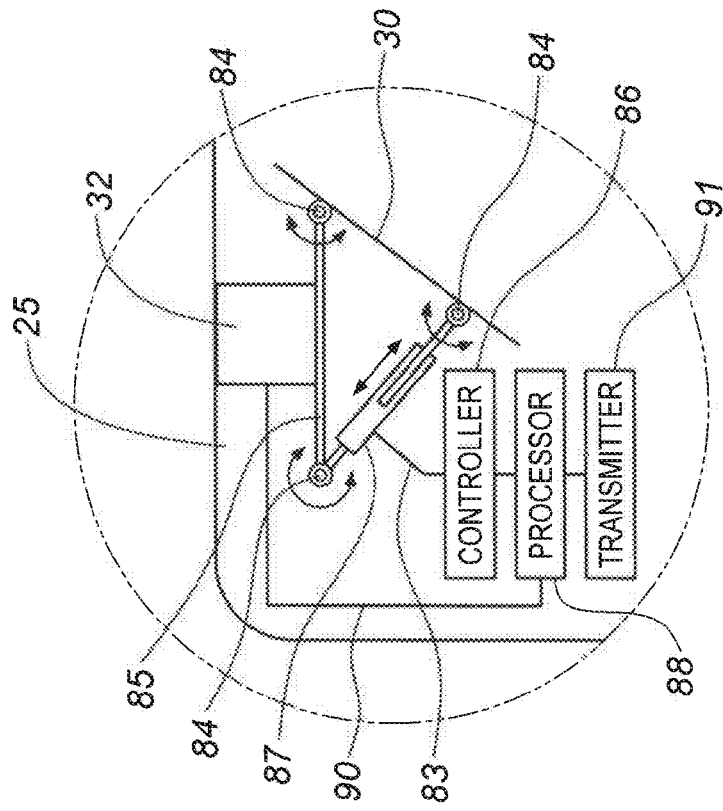
FIG. 6C shows a mass flow sensor having an actuator according to an alternative embodiment of the invention.
Figure 6B:
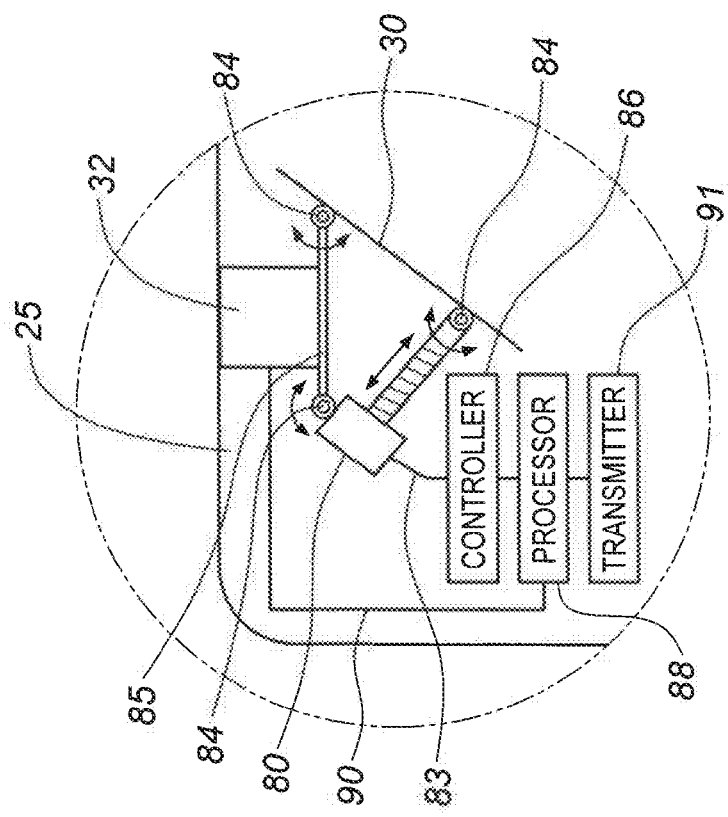

In the nonlimiting example shown in FIGS. 6A-6B, the actuator 80 is a screw actuator that selectively operates in response to the controller 86 to push the impact plate 30 and rotate a hinge 84 that couples the impact plate to a (e.g., stationary) arm 85. Thus, the orientation of the impact plate 30 can be selectively controlled. In another nonlimiting example shown in FIG. 6C, an actuator 87 is embodied in a piston that selectively extends or contracts in response to the controller 86 coupled thereto, which rotates the impact plate 30 about hinge 84 and changes the orientation of the impact plate 30.

A processor 88 (which preferably is, but need not be, the same as or unitary with the controller 86) is coupled to the impact sensor, such as to force transducer 32 via suitable leads 90, for receiving the generated sensor output. Nonlimiting examples of processors include suitably configured microcontrollers, microcontroller boards, microprocessors, computers, portable computing devices, systems-on-a-chip, data acquisition systems, etc. The processor 88 can be configured to perform one or any combination of the calibration and/or estimation methods according to embodiments of the present invention, including (but not limited to) calibration, open-loop estimation, and/or closed-loop estimation. Results of the calibration or estimation methods described herein can be displayed, printed, communicated via wire or wirelessly, uploaded or downloaded, stored in temporary storage or permanent memory or media, etc. Software, including computer-readable and computer-executable program instructions stored on a non-transitory medium that enable a processor or computer to perform embodiments of the present invention, or configured firmware or hardware for performing methods of the invention, can also be provided. The processor 88 can include the model and/or algorithms, which can be stored in the processor or otherwise made accessible to the processor. A transmitter/receiver 91 is preferably provided (located anywhere in the mass flow sensor 84 or elsewhere in the combine 60) to transmit results from processing and/or impact sensing, and to receive instructions from a user, such as via a user interface (shown by example in FIG. 13).

Thus, the processor 88 can be configured to determine (e.g., estimate) the mass flow of the grain in estimation methods based on a model (such as the example models described herein) relating the generated sensor output and the mass flow input. The processor 88 is further configured to calibrate the model. Methods of determining the mass flow rate of the grain and/or calibrating the model can be performed as described above, and as more particularly described herein, in which the measurable parameter is varied by operating the actuator to vary the relative position or orientation of the impact sensor.

A particular (nonlimiting) example model for a mass flow sensor for use with example methods of the present invention will now be described with respect to the mass flow sensor 64. Portions of the following description of the example model are reprinted with permission from Reinke, R., Dankowicz, H., Phelan, J., Kang, W., (2011), Precision Agriculture 12:732-749, © Springer Science+Business Media, LLC, 2011, and reprinted with permission from SAE paper 2010-01-2002 © 2010 SAE International.

Generally, models used in example embodiments of the present invention are preferably configured to provide yield estimates during real-time harvest operation under a variety of operating conditions. A model, as referred to herein, provides a relationship between input(s) and output(s) that can be reliably interrogated to predict outputs given measured inputs or to estimate inputs given measured outputs.

Example models include data-based, empirical, and physical models. Data-based models, for instance, can include numerical look-up tables, indexed by a collection of (e.g., experimentally) collected values of inputs and containing the corresponding (e.g., experimentally) collected values of outputs. Prediction can then be achieved by interpolating the content of the table elements whose indices agree most closely with the given input conditions. Similarly, estimation can be achieved by interpolating the indices of the table elements whose content agree most closely with the given output conditions.

In the simplest case, assume that, under otherwise constant conditions, values have been collected for the amount of mass that flows past a given cross-sectional area per unit time and the corresponding values of the time-averaged force on the impact plate 30. The look-up table is then equivalent to a two-dimensional graph of the discrete force on the impact plate. Under the same otherwise constant conditions, prediction and estimation is the straightforward act of locating intersections of vertical and horizontal lines with a suitably chosen interpolant (e.g., piecewise linear, spline, Fourier).

In the case of data-based models, model development can be accomplished through calibration in which (e.g., vast quantities of) data are experimentally collected to generate an approximate cover of typical operating conditions. Given the uncertainty in the collected experimental data and the difficulty in controlling for operating conditions outside of the measurable inputs, data-based models would typically only provide reliable operation in severely constrained applications.

Empirical models seek to experimentally identify functional relationships between dimensionless combinations of input and output variables.

In the case of the mass-flow sensor, the ratio $$\alpha = \frac{\langle m \rangle V}{\tau \langle F \rangle} \quad (1)$$

is a dimensionless combination of the average mass $\langle m \rangle$ that flows past a given cross-sectional area over some characteristic time $\tau$, the average force $\langle F \rangle$ on the impact plate during this characteristic time, and the translational velocity V of the elevator paddles 24 during their vertical ascent. An empirical model based solely on this dimensionless quantity is then a functional relationship of the form $$f(\alpha)=0 \quad (2)$$

where $f$ is some arbitrary (dimensionless) function of a single variable. This constitutes a (nonlinear) equation in $\alpha$ with (typically, at best) isolated solutions of the form $$\alpha = \alpha_0 \Longrightarrow \dot{m} \stackrel{def}{=} \frac{\langle m \rangle}{\tau} = \alpha_0 \frac{\langle F \rangle}{V} \quad (3)$$

for some dimensionless constant $\alpha_0$. Calibration of this model simply amounts to computing $\alpha_0$ estimated from a large statistical sample of numerical values for $\alpha$, given otherwise constant conditions.

Reliance on the single dimensionless quantity $\alpha$ amounts to the modeling assumption that the value of $\alpha_0$ is independent of $\langle m \rangle$, V, $\tau$, and $\langle F \rangle$ and only a function of other, not-controlled-for, operating parameters that describe the apparatus. The extent to which this can be reliably assumed can be statistically evaluated by exploring the distribution of values for $\alpha$ for otherwise constant conditions. Biasing behavior as a function of any one of the four fundamental quantities $\langle m \rangle$, V, $\tau$, and $\langle F \rangle$ then suggests a need to enlarge the model to (at least) one additional dimensionless quantity.

Consider, for example, the dimensionless combination $$\beta = \frac{\eta w l^2 V \Omega}{\langle F \rangle} \quad (4)$$

of the grain volume density $\eta$, the width of the elevator paddle 24, w, the length of the elevator paddle 1, the translational velocity V of the elevator paddle during the vertical ascent, the angular speed of the sprocket 29, $\Omega$, and the average force $\langle F \rangle$ on the impact plate 30 during the characteristic time $\tau$. An empirical model based on $\alpha$ and $\beta$ is then a functional relationship of the form $$f(\alpha,\beta)=0 \quad (5)$$

where $f$ is some arbitrary (dimensionless) function of two variables. This constitutes a (nonlinear) equation in $\alpha$ as a function of $\beta$ with (typically) a continuum of solutions. Suppose, for example, that $$f:(x,y) \mapsto xy - c_1 y - c_2, \quad (6)$$

in which case $$\alpha\beta - c_1\beta - c_2 = 0 \Longrightarrow \dot{m} = c_1 \frac{\langle F \rangle}{V} + c_2 \frac{1}{\eta w l^2 \Omega} \left(\frac{\langle F \rangle}{V}\right)^2 \quad (7)$$

for some dimensionless constants $c_1$ and $c_2$. Calibration of this model amounts to computing $c_1$ and $c_2$ by fitting the straight line $c_1\beta + c_2$ to the product $\alpha\beta$ using a large statistical sample of numerical values for $\alpha$ and $\beta$, given otherwise constant conditions.

The systematic reliance on dimensionless quantities allows one to enlarge the model complexity in successive steps. From this perspective it would be inappropriate to bulk together $c_2$ with $(\eta w l^2 \Omega)^{-1}$ into a single non-dimensionless quantity, as such would immediately suggest a hidden dependence on unmodeled parameters.

Moreover, a systematic approach to identifying suitable empirical relationships is to first identify all possible (measurable) dimensionless quantities and then to investigate experimentally observed relationships between these. This amounts to experimentally identifying the function $f$ first and subsequently (and when possible) arriving at an explicit relationship for $\dot{m}$ as a function of other measurable quantities.

Figures 8A, 8B:
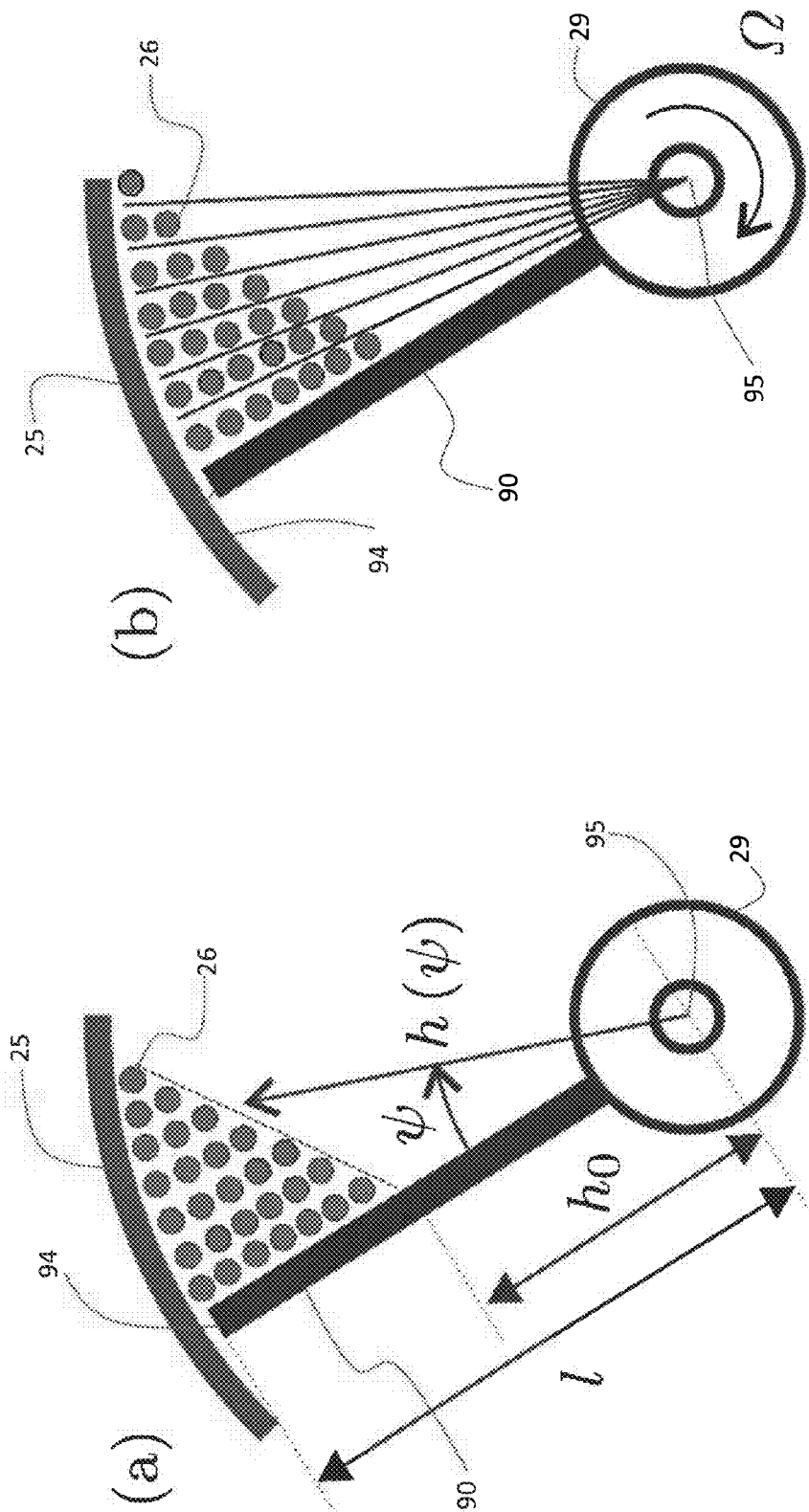
FIGS. 8A-8B show a shape of grain distribution at the end of a settling stage and a side view of grains resting on a paddle, respectively.
Figure 9:
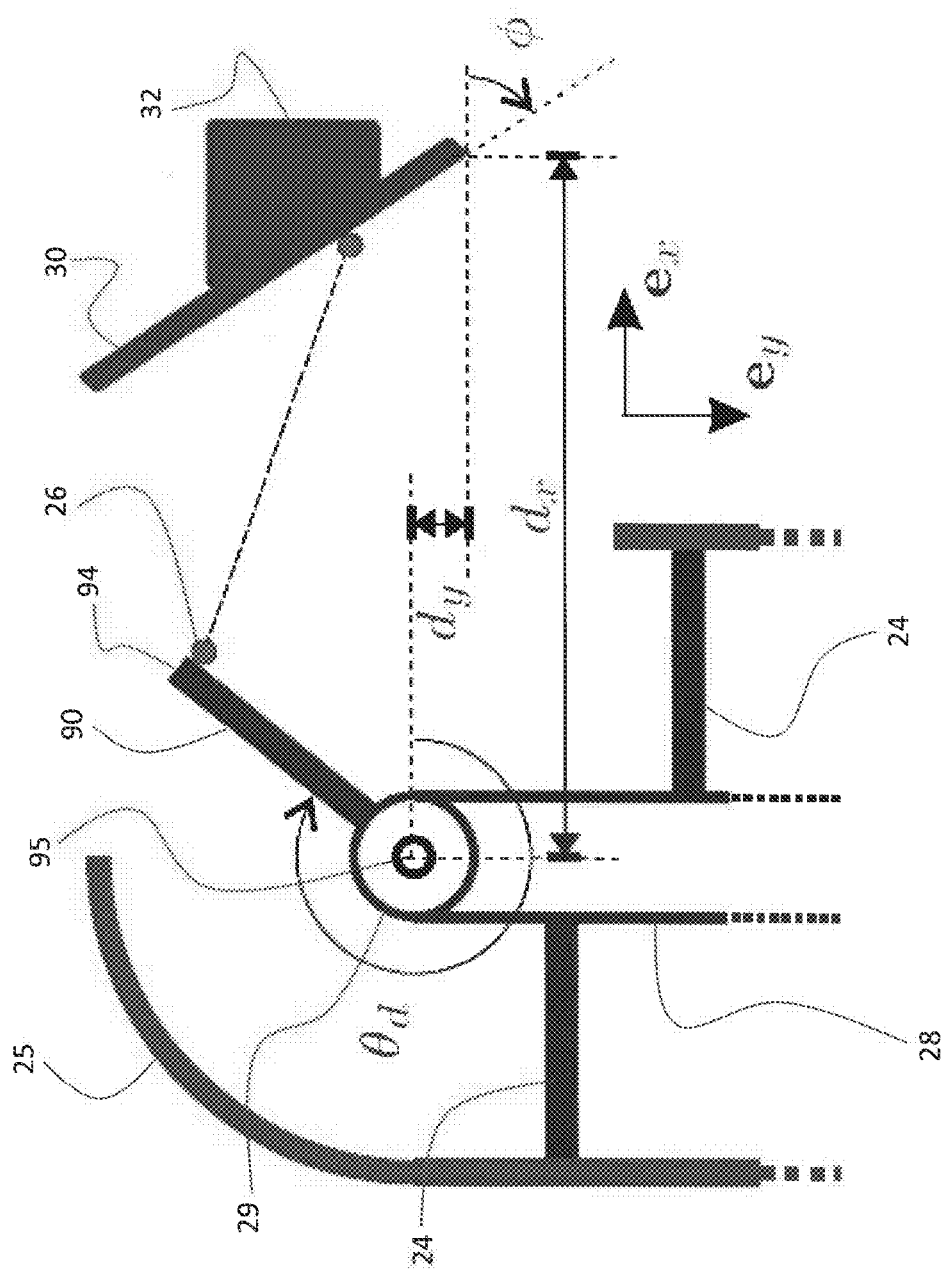
FIG. 9 shows the state of an individual grain, machine geometry, and parameters describing the machine geometry, and characterizing the travel of a grain during a flight stage from release from an elevator paddle toward a flat impact plate.

Physical models, as used in preferred embodiments of the present invention, can be arrived at through a successive causal association between inputs and outputs at various stages of the physical process. To provide a nonlimiting example physical model according to embodiments of the present invention, the physical process is divided into four stages:

1. The filling stage, in which a certain mass of grain 26 is deposited on an elevator paddle of interest 90 (FIGS. 7A-7D);

2. The settling stage, in which the mass deposited on the elevator paddle 90 achieves an equilibrium configuration while the paddle is rotated in space through the interaction with the sprocket 29 (FIGS. 8A-8B);

3. A release stage, in which angular sectors of mass slide outwards following the disappearance of the physical constraint imposed by the enclosure; and 4. A flight stage, in which individual grains 26 travel from the paddle 90 to the impact plate 30 and deposit part of their momentum with the plate, thus resulting in an effective time-averaged force ⟨F⟩ (FIG. 9). Portions of FIGS. 7A-7D, 8A-8B and 9 are reprinted with permission from Reinke, R., Dankowicz, H., Phelan, J., Kang, W., (2011), Precision Agriculture 12:732-749, © Springer Science+Business Media, LLC, 2011.

It will be appreciated that a complete description of each stage of the physical process involves assumptions on the conditions of the system at the onset of each stage, on the behavior of the system during each stage, and on the conditions of the system at the conclusion of each stage. For example, in the case of the filling stage, it can be assumed that no mass is deposited on the paddle 90 prior to the onset of the stage; that mass is deposited onto the paddle during the stage based entirely on the rate of mass flow across the available opening cross section and not based on the amount of mass currently deposited on the paddle; and that the amount of mass deposited onto the paddle during the filling stage equals the amount of mass present on the paddle at the conclusion of the filling stage so that no leakage is allowed for.

Similarly, it can be assumed that the amount of mass present on the paddle 90 at the onset of the settling stage equals that present at the conclusion of the filling stage; that no mass is lost during the settling stage; and that the velocity distribution across the deposited mass at the end of the settling stage equals that of a rigid body of some shape undergoing pure rotation about the center of the sprocket 29. In particular, the input-output relationship for the settling stage corresponds to a description of the shape of the corresponding rigid body for a given amount of mass present on the paddle 90 at the onset of the settling stage. In an example model, a functional relationship parameterized by the total available mass, is provided between the radial thickness of the mass distribution and the angular displacement from the elevator paddle 90. The settling stage is also assumed to conclude at different times for different angular sectors of the equilibrium mass distribution, as each such sector reaches the limit of the physical constraint imposed by the enclosure.

At the onset of the release stage, it is assumed that the grains 26 in each angular sector have achieved a slight non-zero radial velocity with increasing values the further the distance from the center of the sprocket 29, so that no radial interactions are present between grains during the release stage. Moreover, each grain 26 is assumed to experience frictional interactions with grains in adjacent sectors governed by a (dimensionless) coefficient of friction $\mu$. The release stage is also assumed to conclude at different times for grains 26 at different initial radial distances from the center of the sprocket 29, as each such grain reaches the distal end of the elevator paddle 90. Using conservation of momentum, an implicit relationship can then be found between the initial radial position of a grain 26 and its velocity vector at the conclusion of the release stage. For typical operating conditions, this relationship is largely unaffected by gravity and is given by the value of a known nonlinear function evaluated at the elapsed time for which the distal end of the elevator paddle 90 is reached.

Further, it is assumed that the onset of the flight stage, each grain 26 has the velocity vector achieved at the conclusion of the release stage, that it is unaffected by the presence of other grains during the flight stage, and that its interactions with the impact plate 30 (should a collision occur) can be described in terms of the laws of conservation of momentum, a dimensionless kinematic coefficient of restitution e for the change in relative normal velocity, and a conserved relative tangential velocity. For typical operating conditions, the relationship found between the momentum lost in such a collision and the initial grain velocity is largely unaffected by gravity but depends on the position and orientation of the impact plate. In particular, the latter determine not only the fraction of grains that collide with the plate, but also the amount of momentum lost in such a collision.

The composition of the input and output relationships for each stage of the physical process described above results in an implicit, but computable, (algorithmic) relationship between the input and output variables for the overall process. As in the case of an empirical model, this relationship can be written in terms of a functional relationship between dimensionless quantities. In contrast to the empirical model development, however, in the physical model, model coefficients are explicitly expressed in terms of physical quantities, including those describing the mechanical properties of the grains 26; the geometry of the elevator paddles 90, the enclosure (e.g., from housing 25), the impact plate 30; and the laws of physics.

According to an example embodiment of the present invention, the physical model described above can be employed via a regression analysis for calibration and/or estimation. Three distinct uses of model-based regression are possible in the context of the physical model described above, and to a lesser extent the (quasi-) empirical models currently in use. Herein, these are referred to as calibration (or system identification), open-loop estimation, and closed-loop estimation.

Calibration in this embodiment thus can refer to the determination of the values of model parameters that are not directly accessible of measurement (internal parameters). In the case of the empirical models described above, this would include estimation of the values of $\alpha_0$ or $c_1$ and $c_2$ under different experimental conditions. In the case of the example physical model, this can include estimation of the values of the coefficient of friction $\mu$, the coefficient of restitution e, the density of the grain 26 $\eta$, and a variable describing the shape of the grain on the paddle 90 $h_f$ during the settling stage, under different experimental conditions, for example, under varying grain moisture content.

In the context of the example physical model, it is assumed that a computable function $f$ has been arrived at, such that $$\langle F \rangle = f(\dot{m}, \mu, e, \eta, h_f, p), \qquad (8)$$

where p is a collection of system parameters that describe the otherwise constant experimental conditions (assumed for this example independent of moisture properties). Given a large sample of values of ⟨F⟩ and the corresponding values of $\dot{m}$ for a given moisture, nonlinear regression can now be employed to estimate (calibrate) $\mu$, e, $\eta$, and $h_f$ in order to achieve a close agreement between the predictions from Eqn. (8) and the experimental data. By repeating this for different values of moisture, a data-based and/or empirical relationship between moisture (already a dimensionless quantity) and $\mu$, e, $\eta$, and $h_f$ can be arrived at. In each case, the success of the nonlinear regression will depend on the quality of the initial guess for the values of $\mu$, e, $\eta$, and $h_f$ as well as the relative "flatness" (or insensitivity) of $f$ with respect to variations in $\mu$, e, $\eta$, and $h_f$.

In an example open-loop estimation method, a single real-time measurement of ⟨F⟩ is paired to an estimated value of in given known (or approximately known) values of $\mu$, e, $\eta$, and $h_f$. Here optimization can be employed to minimize the difference between the single predicted value from Eqn. (8) and the experimental measurement of ⟨F⟩ Given a known value for the moisture, the empirical or data-based predictions of the values of $\mu$, e, $\eta$, and $h_f$ can be used as fixed inputs to the example model. Employing a bisection algorithm can facilitate the computation of $\dot{m}$.

In example closed-loop estimation, variations in p can be intentionally introduced so as to generate a large sample of values of $\langle F \rangle$ for a single value of $\dot{m}$, for a single moisture. Here, nonlinear regression can be employed to estimate $\mu$, e, $\eta$, $h_f$, and $\dot{m}$ in order to achieve as close agreement between the predictions from Eqn. (8) and the experimental data. Initial guesses for $\mu$, e, $\eta$, and $h_f$ can be obtained from the example calibration process. The advantage of the example closed-loop estimation method is its ability to adapt to varying moisture conditions and crop varieties.

Both open-loop and closed-loop estimation are possible using empirical models, although the physical significance of the estimated variables (e.g., $c_1$ and $c_2$) is not as immediate. Indeed, while the physical model is useful for establishing causal relationships between inputs and outputs at various stages during the physical process, this model relies on a series of assumptions. Physical models preferably are supplemented by some numerical flexibility in model coefficients, so that while individual assumptions may not be well supported by experimental data, the overall example model still captures some essential physical characteristics of the process. Thus, $\mu$, e, $\eta$, and $h_f$ when matched against experimental data may not actually correspond to the coefficient of friction, coefficient of restitution, density, or shape variable in the original mechanical sense, but can still suffice to achieve satisfactory agreement between model predictions and experiments.

Figure 10:
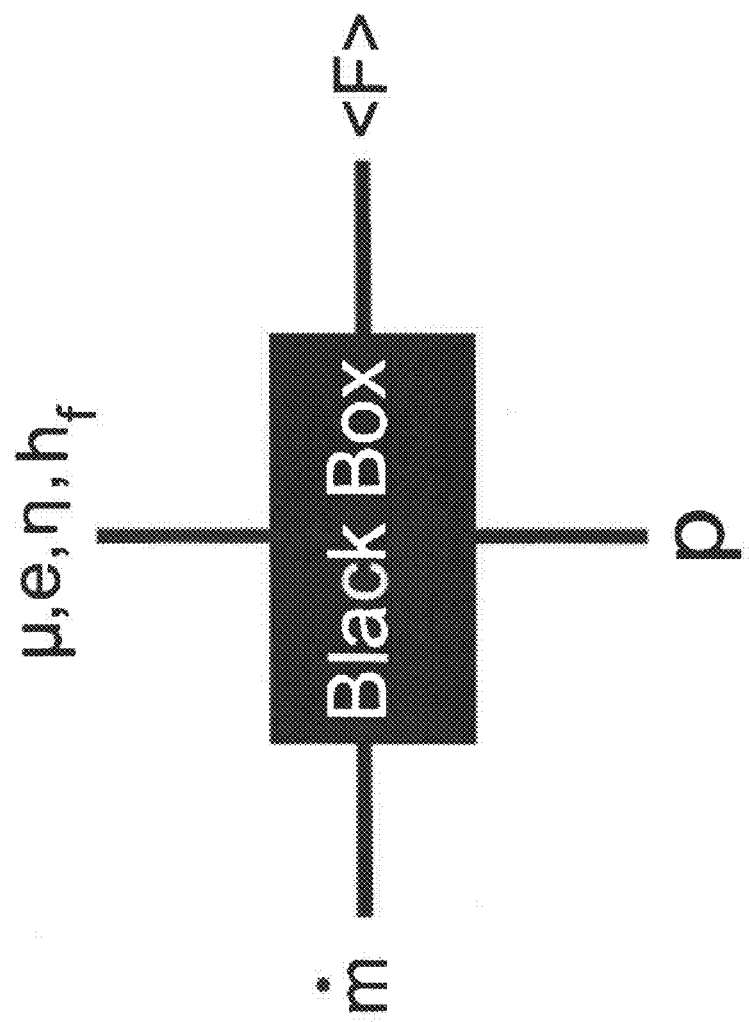
FIG. 10 shows related inputs and outputs for an example mass flow sensor system.

The three example categories of model-based estimation described above can be conveniently analyzed in terms of a block diagram in which numerical values provided to certain leads enable the computation or estimation of a consistent set of numerical values for the remaining leads. In the context of Eqn. (8), consider the block diagram shown in FIG. 10. Here, $\dot{m}$, $\mu$, e, $\eta$, $h_f$, p, and $\langle F \rangle$ refer to a collection of consistent numerical values of the four different leads for which the content of the block represents a truism. It follows that when presented with limited information about the numerical values of one or several leads, sufficient data for the remaining leads and the requirement that the block be trivially satisfied would allow for the estimation methods described above. The block representation thus demonstrates how numerical values for not-directly-measurable parameters may be inferred from knowledge of other inputs/outputs of the black box.

Figures 11A, 11B, 11C:
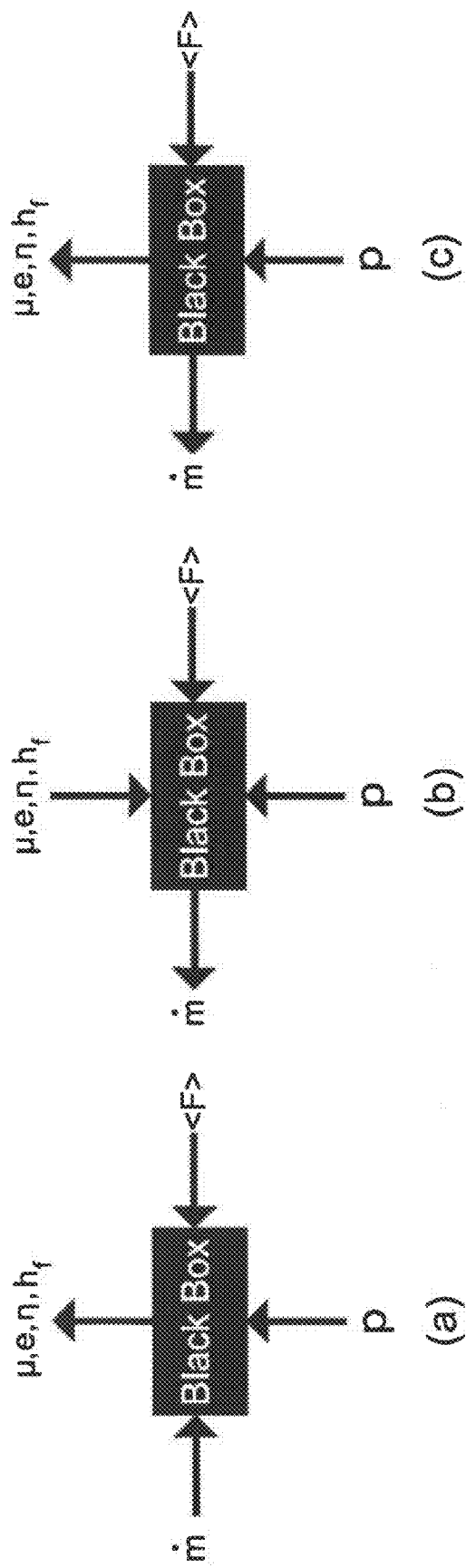
FIGS. 11A-11C show related inputs and outputs for a mass flow sensor for an example system calibration (FIG. 11A), open-loop estimation (FIG. 11B), and closed-loop estimation (FIG. 11C)

For example, in an example method of calibration, it is assumed that p represents a collection of known numerical quantities, and that collections of pairs of consistent values of $\dot{m}$ and $\langle F \rangle$ are available (FIG. 11A). The condition on consistency now imposes constraints on the values of $\dot{m}$, $\mu$, e, $\eta$, and $h_f$. Similarly, in an example open-loop estimation method (FIG. 11B), it is assumed that p again represents a collection of known numerical quantities and that values of $\mu$, e, $\eta$, $h_f$, and $\langle F \rangle$ are available. The condition on consistency now imposes a constraint on the value of $\dot{m}$. Additionally, in an example method of closed-loop estimation (FIG. 11C), several known collections of numerical values of p combined with consistent numerical values for $\langle F \rangle$ enable the regression-based estimation of consistent numerical values for $\mu$, e, $\eta$, $h_f$, and $\dot{m}$.

Nonlimiting example methods of self-calibration according to the present invention exploit a dependence of the physical model described above on the position and orientation of the impact plate 30 to achieve closed-loop estimation. In this example method, the position and/or orientation of the plate 30 is varied (such as via the actuator 80) over a time scale that includes at least a single period of averaging the impact force so as to yield variations in $\langle F \rangle$ which in turn can be used to estimate $\dot{m}$ as well as model parameters used during open-loop estimation. The position and orientation of the plate 30 has been found to affect the force measurements both as a result of variations in the number of grains 26 that actually collide with the plate 30, but also as a result of variations in the amount of momentum lost during such collisions.

Alternatively, the angular velocity $\Omega$ of the sprocket 29 could be varied, which in turn causes a variation in the speed of the elevator paddles 24, 90. This affects the force measurements as a result of variations in the number of grains deposited onto the paddle 24, 90 during the filling stage and consequently variations in the number of grains 26 that actually collide with the plate 30, as well as the velocity at which the grains collide with the plate.

As another alternative, additional information during closed-loop estimation regarding the total mass flow can be gathered by a weighing mechanism that collects grains over many cycles of operation and then computes a total mass at discrete sample intervals. Such a setup is equivalent to the following mathematical formulation $$\langle F \rangle_1 = f(\dot{m}_1, \mu, e, \eta, h_f, p) \qquad (9)$$
$$\vdots$$
$$\langle F \rangle_n = f(\dot{m}_1, \mu, e, \eta, h_f, p),$$
$$\dot{M} = \sum_{i=1}^{n} \dot{m}_i, \qquad (10)$$

where $\langle F \rangle$ and $\dot{M}$ are experimentally measured quantities, and $\dot{m}_i$, $\mu$, e, $\eta$, and $h_f$ are unknown quantities to be estimated. Although knowledge of $\dot{M}$ would further constrain the problem of finding values for $\dot{m}_i$, $\mu$, e, $\eta$, and $h_f$, the number of unknowns still exceeds the number of equations.

By contrast, the example closed-loop estimation method described above is equivalent to the following mathematical formulation $$\langle F \rangle_1 = f(\dot{m}, \mu, e, \eta, h_f, p_1), \qquad (11)$$
$$\vdots$$
$$\langle F \rangle_n = f(\dot{m}, \mu, e, \eta, h_f, p_n),$$

where $\langle F \rangle$ and $p_i$ are measured quantities and $\dot{m}$ (assumed effectively the same across all the different values of p), $\mu$, e, $\eta$, and $h_f$ are unknown quantities to be estimated. Here, a surplus of equations provides more statistical strength to the regression analysis.

Using the models, an example method of the present invention can perform model-based estimation, including calibration, open-loop estimation, or closed-loop estimation. A regression analysis preferably is performed to estimate one or more parameters in the physical model. Suitable software may also be used, for instance, to validate the model-based estimation.

Generally, software (or hardware, or firmware) suitably configured can be used to implement the computable relationship $\tilde{f}$ in Eqn. (8) in terms of an algorithm that, given values for $\dot{m}$, $\mu$, e, $\eta$, $h_f$, and p, generates a consistent value for $\langle F \rangle$. This can be referred to as a forward computational model with a well-defined collection of inputs and a unique and directly computable output. More particularly, the example software can perform individual functions that compute the relevant inputs at each stage of the physical process.

To invert the relationship between the physical quantities for estimation, an example method couples the forward computational model with an optimization or regression algorithm that iteratively updates estimated values of the input variables in order to achieve convergence of the predicted values of ⟨F⟩ with existing reference values. In a nonlimiting example case of calibration, this is achieved by wrapping the forward computational model within function lsqnonlin, which is a MATLAB® least-squares function. This function seeks to achieve agreement between predicted values of ⟨F⟩ and existing reference values by minimizing the sum of squares of errors given a suitable initial guess for the unknown parameters. The example software implementation uses a subspace trust-region method that avoids the need for explicitly computed error gradients. As with most optimization methods, the example function lsqnonlin provides at best a local minimum in the computed sum of squares of errors and may not converge to the globally optimal set of values of the unknown parameters unless the initial guess lies sufficiently close to this set (or, more generally, in the basin of attraction of this global minimum). The function lsqnonlin also allow the user to constrain the optimization to bound the values of the unknown parameters to closed intervals.

Figure 12:
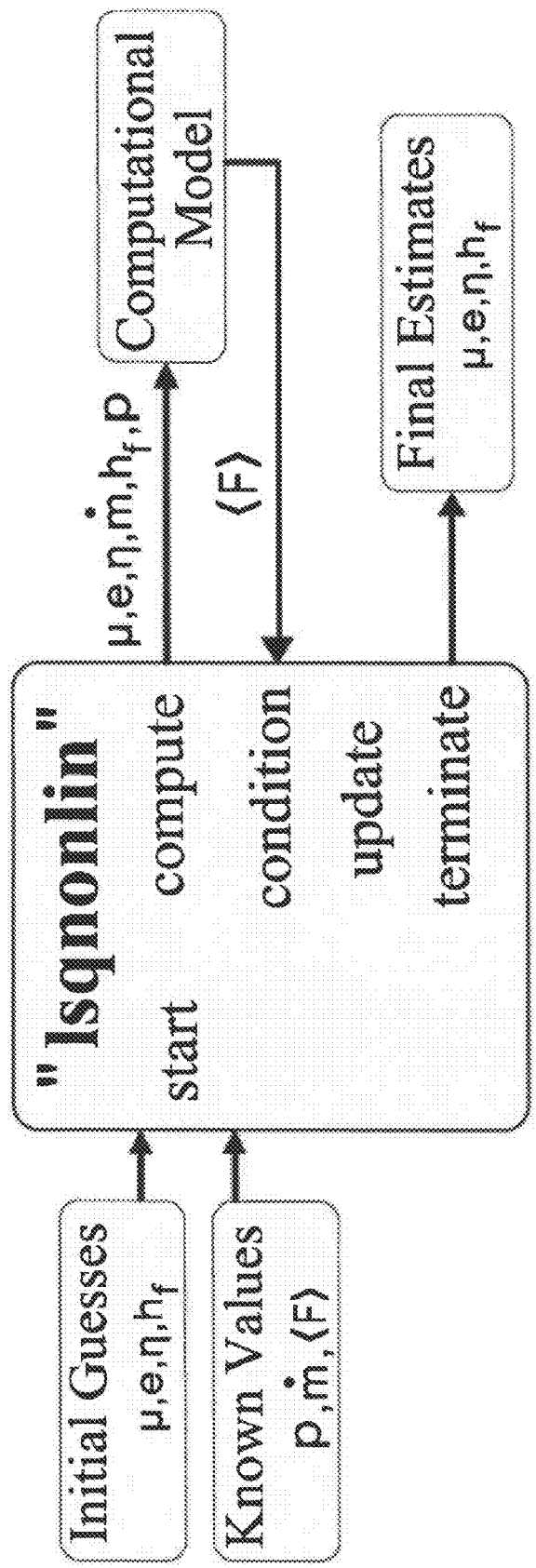
FIG. 12 shows an example computation flow for implementing calibration, according to an embodiment of the present invention.

FIG. 12 shows an example computation flow for implementing calibration using the least-squares function. Schematically, the lsqnonlin block includes five discrete states, namely the 'start', 'compute', 'condition', 'update', and 'terminate' states. The lsqnonlin block initiates in the 'start' state and terminates in the 'terminate' state.

In the 'start' state, initial guesses for $\mu$, e, $\eta$, and $h_f$ are input together with known values for the elements of p and collections of known reference values for $\dot{m}$ and ⟨F⟩. The state of the lsqnonlin block then becomes 'compute'.

In the 'compute' state current values of $\mu$, e, $\eta$, and $h_f$ together with known values for the elements of p and collections of known values for $\dot{m}$ are used for inputs to the forward computational model, which returns predicted values of ⟨F⟩. The state of the lsqnonlin block then becomes 'condition'.

In the 'condition' state, the sum of squares of differences between predicted and reference values of ⟨F⟩ is computed. If this quantity exceeds a lower cutoff and no other interrupt conditions are satisfied, then the state of the lsqnonlin block becomes 'update'. Otherwise, the state of the lsqnonlin block becomes 'terminate'.

In the 'update' state, the example optimization algorithm is employed to provide improved numerical estimates for the values of $\mu$, e, $\eta$, and $h_f$ and the state of the lsqnonlin block returns to 'compute'.

In the 'terminate' state, the current numerical estimates for the values of $\mu$, e, $\eta$, and $h_f$ are returned to the outside operating system.

Alternatively, several instances of the 'compute' and 'update' states may be combined in generating improved numerical estimates for the values of $\mu$, e, $\eta$, and $h_f$. This example regression algorithm tunes the values of the internal parameters to reduce the estimation error and allow close agreement between predicted and measured force values.

An example physical model that can be used with the regression functions above will now be described in more detail. Computer simulations were used to inform this example physical model. This physical model divides the flow of particles (e.g., grain) through the mass-flow system into the four stages (filling stage, settling stage, release stage, and flight stage) described above.

Filling Stage:

This initial stage is one in which the grain 26 is deposited on the paddle 24, 90 from the auger 27 located near the bottom of the elevator. The grain 26 exits from a circular opening 92 at the top of the auger 27 and is deposited on the paddles 24, 90 as the paddles move upward. It is assumed that no mass is deposited on the paddle of interest 90 prior to the onset of the stage; that mass is deposited onto the paddle during the stage based entirely on the rate of mass flow across the available opening cross section and not based on the amount of mass currently deposited onto the paddle; and that the amount of mass deposited onto the paddle during the filling stage equals the amount of mass present on the paddle at the conclusion of the filling stage so that no leakage is allowed for.

Figures 7A, 7B, 7C, 7D:
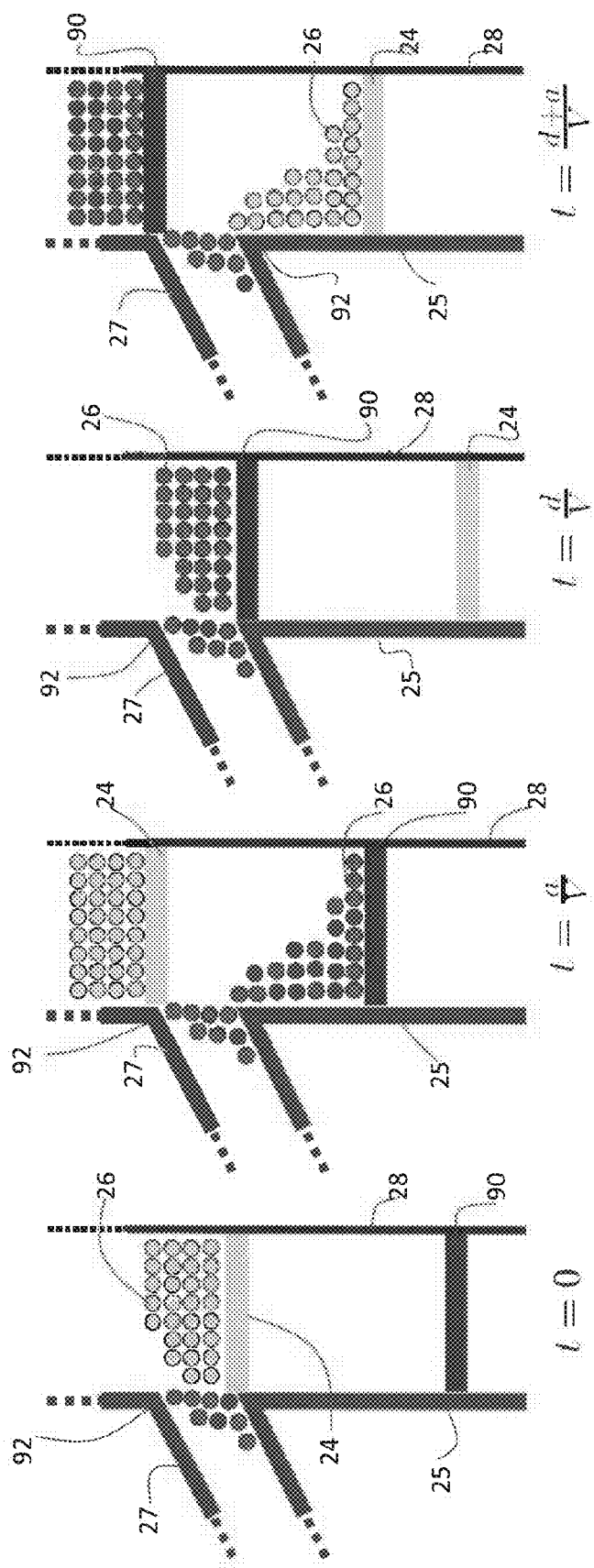
FIGS. 7A-7D show successive stages during a filling stage, including a process of depositing grain exiting from an auger onto a single paddle and onto adjacent paddles.

The mass deposited on the paddle of interest 90 is a function of time and is dependent on the percentage of available area of the auger 27 opening for the specific paddle of interest. This is described as:

$$dM = \dot{m}P(t)dt, \quad (12)$$

where dM is the change in mass deposited onto the paddle 90 during an infinitesimal time interval dt and P(t) represents the percentage of opening of the exit of the auger at time t. This percentage of available area for the particular paddle of interest 90 changes as paddles pass by the auger opening 92 as shown in FIGS. 7A-7D and is described by the following:

The paddle 24 located ahead of the paddle of interest 90 is passing directly by the auger 27, such that a portion of the total auger area is available to supply grain 26 to the paddle of interest, and the remaining portion of the auger area is supplying grain to the paddle located ahead of the paddle of interest (FIGS. 7A-7B).

The paddle 24 ahead of the paddle of interest 90 has passed the auger 27 completely, such that the entire auger opening 92 is supplying grain to the paddle of interest (FIGS. 7B-7C).

The paddle of interest 90 is passing directly by the auger 27 such that the auger is simultaneously supplying grain 26 to the paddle of interest and to the paddle located behind the paddle of interest (FIGS. 7C-7D).

Without loss of generality, assuming a rectangular cross-sectional area and a distance between paddles that is greater than the vertical distance of the auger opening 92, one obtains $$P(t) = \begin{cases} \dfrac{V}{a}t: & 0 < t < \dfrac{a}{V} \\ 1: & \dfrac{a}{V} < t < \dfrac{d}{V} \\ 1 + \dfrac{d - Vt}{a}: & \dfrac{d}{V} < t < \dfrac{d+a}{V} \end{cases} \quad (13)$$

where V is the linear velocity of the paddles 24, 90 d is the distance between paddles, and α is the vertical distance of the auger opening 92. In this case, the total mass deposited on a single paddle equals $$M = \dot{m} \int P dt = \dot{m}\dfrac{d}{V}. \quad (14)$$

Settling Stage:

In this second stage (FIGS. 8A-8B), the grain 26 deposited on the paddle 90 is assumed to settle under the combined influence of gravity, contact with the housing 25, and contact with the rotating paddle. It is assumed that the amount of mass present on the paddle 90 at the onset of this stage equals that present at the conclusion of the filling stage; that no mass is lost during this stage; and that the velocity distribution across the deposited mass at the end of this stage equals that of a rigid body of some shape undergoing pure rotation about the center 95 of the sprocket 29.

Denote by l the distance to the distal end 94 of the paddle 24 from the center 95 of the sprocket 29. Given the above assumptions, the shape of the grain distribution at the end of the settling stage is modeled (for example) by the dependence of the radial thickness l−h(ψ) on the angle 0≤ψ≤ψ$_f$ measured from the paddle 90 as shown in FIGS. 8A-8B. Here, ψ$_f$ represents the maximal angle achieved by the grain distribution.

An approximate shape of the grain distribution was derived from computer simulations with different numbers of grain deposited on the paddle 90. The inner boundary of the grain 26 distribution closely approximates a straight line, consistent with the following assumed function of the angular displacement from the paddle 90

$$h(\psi) = l\left(\frac{l}{h_0}\cos\psi + \left(1 - \frac{1}{h_0}\cos\psi_f\right)\frac{\sin\psi}{\sin\psi_f}\right)^{-1}, \quad (15)$$

which satisfies the boundary conditions $$h(0)=h_0, \quad (16)$$

and $$h(\psi_f)=l. \quad (17)$$

Moreover, while the arclength of the radial layer in contact with the housing 25, lψ$_f$, and the thickness of the angular sector resting against the paddle 90, l−h$_0$, both depend on the number of grains 26, the ratio $$h_f = \frac{l\psi_f}{l - h_0} \quad (18)$$

was found to be approximately constant and equal to 2 for a range of total grain numbers and fixed angular sprocket 29 speed.

The value of h$_0$ may be obtained given a total deposited mass M on the paddle 90 by considering the total volume of grain 26 enclosed by the housing 25 and the rotating paddle. With the profile of the grain 26 characterized by the function h(ψ), the cross-sectional area of grain can be represented by $$A_{grain} = h_f \frac{l(l - h_0)}{2} - \frac{h_0 l}{2}\sin\left(h_f \frac{l - h_0}{l}\right). \quad (19)$$

Given a total mass M of grain 26 deposited onto the paddle 90 during the filling stage and given the grain density η, the width of the paddle w, and the length ratio h$_f$, h$_0$ can now be obtained from the unique solution on the interval (0, 1) to the nonlinear equation $$\frac{M}{\eta w l^2} = \frac{A_{grain}}{l^2} = h_f \frac{1 - \tilde{h}_0}{2} - \frac{\tilde{h}_0}{2}\sin(h_f(1 - \tilde{h}_0)), \quad (20)$$

where $\tilde{h}_0 = h_0/l$. In an example forward-computational model this can be achieved through bisection on this interval.

Release Stage:

This third stage is one in which distinct angular sectors of grain 26 are no longer constrained by the housing 25 but are still constrained by the motion of the paddle 90. It is assumed that, at the onset of the release stage, the grains 26 in each angular sector have achieved a slight non-zero radial velocity with increasing values the further the distance from the center of the sprocket 29, so that no radial interactions are present between grains during the release stage. Moreover, each grain 26 is assumed to experience frictional interactions with grains in adjacent angular sectors governed by a (dimensionless) coefficient of friction μ. Finally, the release stage is assumed to conclude at different times for grains 26 at different initial radial distances from the center of the sprocket 29, as each such grain reaches the distal end of the elevator paddle 90.

Computer simulations showed a trend of higher radial velocities for individual grains 26 located in radial layers further from the sprocket 29 than for those at closer radial distances. This is because once the constraint imposed by the housing is removed, the grains 26 in the radial layer furthest from the sprocket are acted on in the radial direction only by a force from the grains in the adjacent radial layer nearer to the sprocket 29. This causes the grains 26 in the furthest radial layer to accelerate radially outward, which in turn causes the force between those grains and the grains in the adjacent radial layer to decrease to the point that the force is zero. The effect is a separation between grains 26 in these radial layers. This trend continues for radial layers approaching the center of the sprocket 29 and results in no contact forces between grains 26 in adjacent radial layers, in agreement with the assumption made on the interactions during the release stage. It was also assumed for the example physical model that grains 26 located at the same initial radial position after the settling phase will have the same traveling time from their initial location to the distal end 94 of the paddle 90, and computer modeling simulations further confirmed this assumption.

Given these assumptions, consider a Cartesian coordinate system with origin at the center of the sprocket, horizontal axis x pointing towards the impact plate, and vertical axis y pointing downwards. Let e$_x$ and e$_y$ denote orthogonal unit vectors pointing in the positive direction of the x and y axes, respectively. To determine the traveling time of a grain 26 from its initial position to its arrival at the distal end 94 of the paddle 90, as well as its release velocity at the conclusion of the release stage, it is assumed that the grain dynamics are constrained to follow the angular motion of the paddle throughout this stage, i.e., that $\dot\theta=\Omega$ (see FIG. 8B) throughout the release stage, where tan θ=y/x.

In terms of the nondimensional radial distance $\tilde\rho=\rho/l$ from the center of the sprocket 29, the equation of motion during the release stage for an individual grain 26 is then given by $$\tilde\rho'' = \tilde\rho - 2\mu\tilde\rho' + \tilde{g}(-\sin\tau - \mu\cos\tau), \quad (21)$$

where primes denote differentiation with respect to non-dimensionalized time=$\tau=\Omega t$ and $$\tilde{g} = \frac{g}{l\Omega^2} \ll 1 \tag{22}$$

given (for instance) the characteristic paddle length $l=0.16$ m, sprocket rotational speed $\Omega=400$ rpm, and gravitational acceleration g. Equation (21) can be derived, for instance, from balance of momentum laws of Newtonian mechanics. Typical non-dimensionalized travel times are found to be on the order of $10^{-1}$. Consequently, the effects of gravity are ignored in the subsequent calculations. Given a grain 26 initially at rest at radial distance $\rho_0$, the analytical solution for the simplified equation of motion then equals $$\tilde{\rho}(\tau) = C_1 e^{(-\mu-\sqrt{1+\mu^2})\tau} + C_2 e^{(-\mu-\sqrt{1+\mu^2})\tau} \tag{23}$$

with coefficients $$C_{1,2} = \frac{1}{2}\left(\tilde{\rho}_0 \mp \frac{\tilde{\rho}_0 \mu}{\sqrt{1+\mu^2}}\right). \tag{24}$$

Given $\rho_0$, the traveling time $\tau_d$ can now be obtained as the unique solution to the nonlinear equation $$0 = 1 - \tilde{\rho}(\tau_d) = 1 - C_1 e^{(-\mu-\sqrt{1+\mu^2})\tau_d} - C_2 e^{(-\mu+\sqrt{1+\mu^2})\tau_d}. \tag{25}$$

In an example forward-computational model this is again achieved through bisection with an initial guess derived from an approximate solution in the limit that $\mu \to 0$. The release velocity at the conclusion of the release stage is now given by $$v_d = l\Omega \begin{bmatrix} \left(\tilde{\rho}'(\tau_d)\cos\left(\tau_d + \frac{3\pi}{2}\right) - \sin\left(\tau_d + \frac{3\pi}{2}\right)\right)e_x + \\ \left(\tilde{\rho}'(\tau_d)\sin\left(\tau_d + \frac{3\pi}{2}\right) + \cos\left(\tau_d + \frac{3\pi}{2}\right)\right)e_y \end{bmatrix} \tag{26}$$

where $$\tilde{\rho}'(\tau) = \tag{27}$$
$$C_1 e^{(-\mu-\sqrt{1+\mu^2})\tau}(-\mu-\sqrt{1+\mu^2}) + C_2 e^{(-\mu+\sqrt{1+\mu^2})\tau}(-\mu+\sqrt{1+\mu^2})$$

Flight Stage:

This fourth stage is one in which the grains 26 are in free flight and are traveling towards a flat impact plate 30, as shown in FIG. 9. In an example physical model, it is assumed that at the onset of the flight stage, each grain 26 has the velocity vector achieved at the conclusion of the release stage and that its motion is unaffected by the presence of other grains. Additionally, it is assumed that interactions with the impact plate 30 (should a collision occur) can be described in terms of the laws of conservation of momentum, a dimensionless kinematic coefficient of restitution e for the change in relative normal velocity, and a conserved relative tangential velocity.

An example computable relationship will now be derived for determining the portion of grains 26 that contact the impact plate 30, as well as for the force exerted on the impact plate due to collisions with the grains. The flight path of grains 26 after discharge from the paddle was examined using computer simulations. From this analysis it was apparent that the flight paths of grains 26 can be closely approximated by straight-line motion with unchanged speed, as the short time of flight again implies a negligible contribution due to gravity.

To compute the net force acting on the impact plate, the portion of grains that collide with the impact plate is determined. Previous modeling has determined that at least 15% to 20% of grains on a paddle full of grains will have a considerable downward velocity component, indicating that these grains will miss the impact plate. Given the assumption of straight-line motion, whether an individual grain 26 reaches such a collision is determined by its position and velocity at the conclusion of the release stage. As illustrated above, these quantities depend only on the initial radial distance $\rho_0$ and not on the initial angular displacement of the grain relative to the paddle. It follows that there exists a lower bound $\rho_{crit}$ such that grains initially inside of the radial distance $\rho_{crit}$ miss the impact plate 30 due to arriving too late at the distal end 94 of the paddle 90.

Specifically, the position of a grain 26 located at the initial distance $\rho_0$ at the conclusion of the release stage is given by $$\cos\theta_d e_x + l\sin\theta_d e_y \tag{28}$$

where $\theta_d = 3\pi/2 + \Omega t_d$. It follows that the path described by the grain 26 during the flight stage is given by $$(l\cos\theta_d + v_x\lambda)e_x + (l\sin\theta_d + v_y\lambda)e_y \tag{29}$$

Similarly, the geometry of the impact plate 30 is described by the parameterized straight line $$(d_x + \kappa\cos\phi)e_x + (d_y + \kappa\sin\phi)e_y \tag{30}$$

where $d_x$ and $d_y$ correspond to the horizontal and vertical distances, respectively, from the lowermost point of the impact plate 30 to the center of the sprocket 29, and $\phi$ is the angle of the impact plate, measured clockwise from the positive x-axis, as shown in FIG. 9.

Intersections between the flight path and the impact plate 30 thus occur for $$\lambda = \frac{(d_x - l\cos\theta_d)\sin\phi - (d_y - l\sin\theta_d)\cos\phi}{v_x\sin\phi - v_y\cos\phi} \tag{31}$$

and $$\kappa = \frac{v_x(d_y - l\sin\theta_d) - v_y(d_x - l\cos\theta_d)}{v_y\cos\phi - v_x\sin\phi} \tag{32}$$

The critical radius $\rho_{crit}$ is now given by the value of $\rho_0$ for which $\lambda > 0$ and $\kappa = 0$, since $\kappa < 0$ for grains 26 that impact the plate 30.

It can be determined that the loss of momentum of a grain 26 that impacts the plate 30 equals $$\delta m(1+e)[(v_{d,x}\sin\phi - v_{d,y}\cos\phi)\sin\phi e_x + (v_{d,y}\cos\phi - v_{d,x}\sin\phi)\cos\phi e_y] \tag{33}$$

By conservation of momentum, the momentum lost by the grain 26 is momentum gained by the impact plate 30. The time-averaged force on the impact plate 30 is therefore approximately the total momentum gained by the impact plate 30 through collisions with grains 26 divided by the relevant time interval $\Delta T$. For simplicity, let the characteristic time interval be the time between successive paddles 24, 90 reaching the end of the housing 25, i.e., $\Delta T=d/V$.

The total momentum in the horizontal direction gained by the impact plate 30 as a result of collisions with the grains 26 deposited on a single paddle 90 can be shown to equal $$\Delta P = \begin{cases} \int_{\rho_{crit}}^{1} (v_x\sin\phi - v_y\cos\phi)\sin\phi(1+e)\rho h^{-1}(\rho)\eta w\,d\rho & \rho_{crit} > h_0 \\ \int_{h_0}^{1} (v_x\sin\phi - v_y\cos\phi)\sin\phi(1+e)\rho h^{-1}(\rho)\eta w\,d\rho & h_0 > \rho_{crit} \end{cases} \quad (34)$$

where $\eta$ again denotes the volume density, w denotes the paddle 90 width, and $h^{-1}(\rho)$ computes the opening angle $\psi$ for which $h(\psi)=\rho$, such that $\rho h^{-1}(\rho)wd\rho$ is a volume element of a radial layer. Note that $h_0$ depends in a nonlinear fashion on $\eta$.

The time-averaged force <F> on the impact plate 30 is now approximately equal to the total momentum $\Delta P$ gained by the impact plate through collisions with grains 26 divided by the relevant time interval $\Delta T$:

$$\langle F \rangle = \frac{\Delta P}{\Delta T}. \quad (35)$$

It can be shown that the predicted momentum generally decreases in a non-linear fashion with increasing values of $\mu$, increases linearly with increasing values of e, and increases in a non-linear fashion with increasing values of $\eta$ and $h_f$. Increases in $\mu$ contribute to more dissipation of the energy of the grain within the system, and in turn a larger value for the critical radius, $\rho_{crit}$, thereby lowering the resulting momentum imparted to the impact plate. Conversely, increases in e contribute to the efficiency of energy transfer from the grain to the impact plate, resulting in a higher transfer of momentum. Higher grain density, $\eta$, for constant rates of mass flow, leads to increases in kinetic energy of the grain, which is ultimately transferred to the impact plate, thereby leading to higher momentum. Larger values of $h_f$ contribute to a distribution of grain nearer to the tip of the paddle where the rotational velocity is higher, which ultimately leads to higher grain velocities for a larger number of grains. Additionally, grains at the furthest radial layers during the settling phase are more likely to have a trajectory that will intersect with the impact plate and transfer momentum to the plate, rather than miss below the plate and transfer no momentum. In general, the momentum transferred to the impact plate appears to depend more strongly on the model parameters $h_f$ and e than $\eta$ and $h_f$.

The example physical model allows for a prediction of the impact force measured on the plate 30 as a function of the mass flow rate and parameterized by a number of model parameters. Examiner known machine geometric parameters in the example physical model include V, d, $\Omega$, l, w, $d_x$, $d_y$, and theoretic model (internal) parameters include $\mu$, e, $\eta$, and $h_f$. As explained above, a nonlinear regression algorithm can be used in example methods to calibrate the model (internal) parameters. Initial guesses may be used for the model parameters from any source, including estimation (calibration) results from earlier-performed methods. For example, estimates for the parameters can be obtained by seeking to minimize the sum of squared residuals of predicted momenta (or impact force, in other example methods). The combination of parameters that resulted in the lowest maximum percent error in the predicted momentum can then be selected as optimal.

In a nonlimiting example nonlinear regression algorithm, the termination criterion is the first occurrence of: a change of $10^{-6}$ or less in the sum of squared residuals, a change of $10^{-6}$ or less in the desired parameters, or 100 iterations. Nonlimiting example upper and lower bounds for the parameters during regression analysis include $0\leq\mu\leq1$, $0\leq e\leq1$, and $$750\frac{\text{kg}}{\text{m}^3} \leq \eta \leq 2000\frac{\text{kg}}{\text{m}^3},$$

or in other example methods bounds of ±10% from parameters estimated in earlier guesses.

Given the estimated parameter values, a bisection algorithm or other algorithm can be used in an example open-loop estimation method to estimate the mass flow rates corresponding to the momentum values. Where both the parameter values and the mass flow rate are estimated simultaneously (e.g., as in the case of the example closed-loop estimation method), the regression algorithm can be used to estimate or update both the parameter values and the mass flow rate.

Thus, in example embodiments of the present invention, a calibration method can be performed by estimating values for model parameters in order to fit the mathematical model with observed pairs of mass flow rate and momentum transferred to the impact plate 30. A nonlimiting method applies a nonlinear regression algorithm to the mathematical model (e.g., a least-squares algorithm) to estimate the internal parameters.

Estimation of mass flow is then achievable given constant conditions for model parameters using example open-loop estimation. For example, open-loop estimation can be achieved by applying a bisection algorithm to the mathematical model. An example open-loop estimation method can estimate the mass flow rate where the internal model parameters were estimated from the previously-performed system calibration process.

Further, in the case that model parameter values need to be estimated during real-time operation, the example closed-loop estimation method may be used, which simultaneously estimates mass flow rate and self-calibrates the system 20, 64 by updating model parameters. The example closed-loop estimation method collects sensor values for each of varying measurable parameters (e.g., impact plate angles) and estimates both mass flow rate and internal model parameters (e.g., via a nonlinear regression algorithm) to achieve real-time calibration of the mass flow sensor system. Initial guesses for the model parameters can be derived from an earlier calibration or a prior closed-loop estimation method. Thus, an example method accommodates changes in these model parameters. In this manner, the example model can be fitted for varying grain conditions, such as moisture content, which may have an effect on the frictional characteristics of the system, the coefficient of restitution, grain density, and/or distribution of grain 26 as it moves through the system 20, 60.

Those of ordinary skill in the art will appreciate that various modifications to the physical model, such as the model in Eqn. (34) are possible. As a nonlimiting example, to accommodate possible overestimation of the proportion of grain that miss the impact plate (which may become more significant, for instance, at larger mass flow rates), when applying an example regression algorithm the multiplicative factor 1+e in the momentum equation (34) can be replaced by $$\left(k_1 \frac{M}{M_{full}} + k_2\right),$$

where $M_{full}$ is the amount of mass, for a given value of the density η, corresponding to $h_0=0$.

When implementing the example modified calibration algorithm η represents friction, and $k_1$ and $k_2$ capture the exchange of momentum with the impact plate while compensating for the overly conservative estimates on the number of grains that miss the plate, as discussed above. The estimated values of $k_1$ and $k_2$ can also be provided to accommodate errors in the force measurements when deriving the model (e.g., since data is sampled at a fixed discrete timestep and is therefore unlikely to capture the maximal force applied to the plate from individual particles (in example simulations, contact is modeled by a stiff normal spring)) and/or errors based on the particular methods employed for measuring force. Nonlimiting example upper and lower bounds for $k_1$ and $k_2$ for estimation include $0 \leq k_1 \leq 5$, and $0 \leq k_2 \leq 5$. As stated above, in an example embodiment the parameter $h_f$ can be fixed (e.g., equal to 2 based upon observations from computer simulations).

Figure 13:
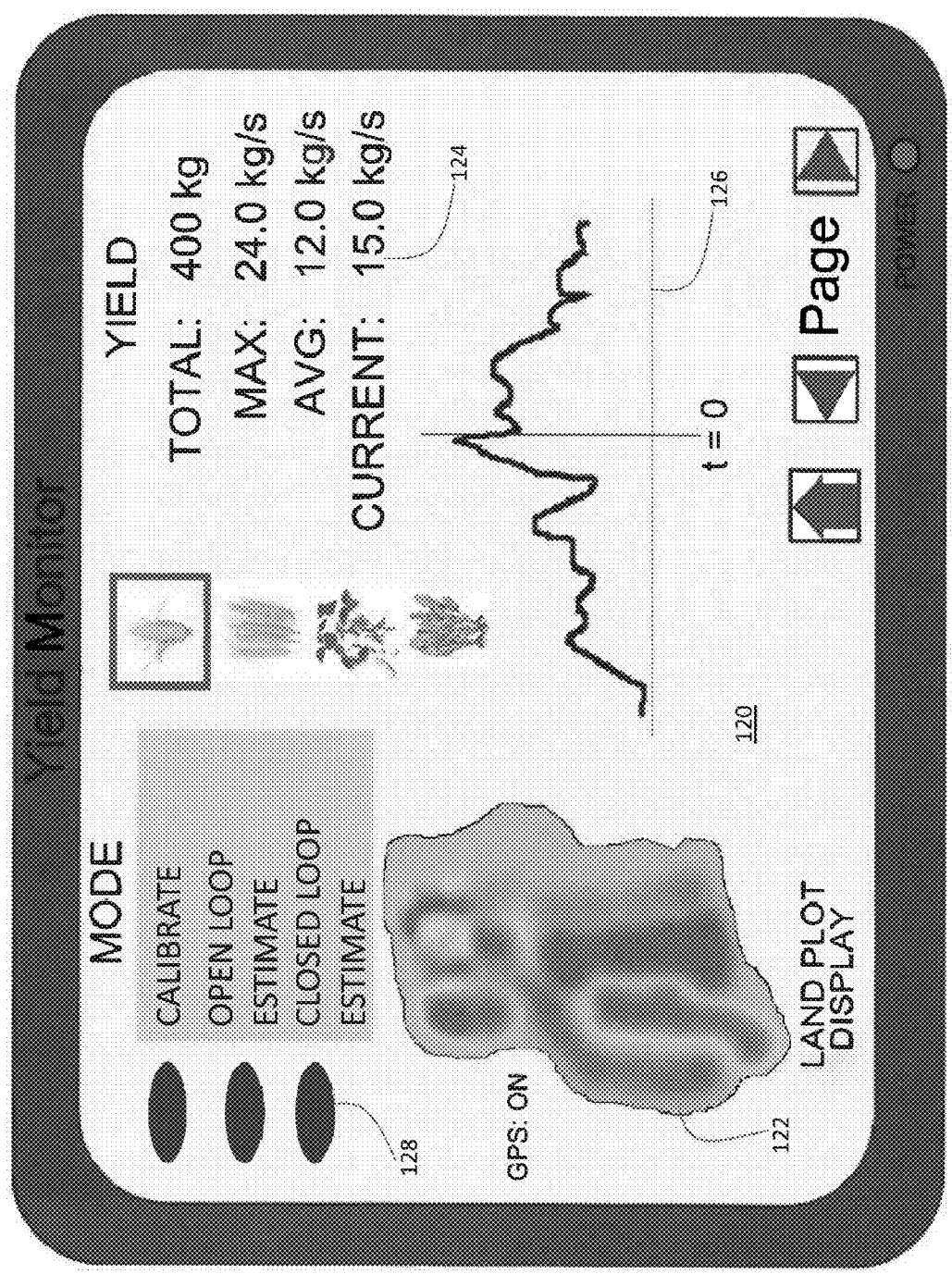
FIG. 13 shows an example display presented to the user, including an interface for input from a user and output/feedback for the user, and controls for starting initial calibration, open-loop estimation, and closed-loop estimation.

FIG. 13 shows an example user interface 120 for allowing a user (e.g., a combine operator) to operate the example mass flow sensor 64. The example interface 120 includes a land plot display 122, which can use location data (e.g., GPS data) to provide visual feedback for a land plot. Yield feedback 124 is provided, including total yield, maximum rate, average rate, and current rate. A graph 126 is also provided showing yield with respect to time. Controls 128 (e.g., soft or hard buttons) are provided for selecting either calibration mode, open loop estimation mode, or closed loop estimation mode according to example methods provided herein.

Methods for improved accuracy and self-calibration for a mass flow sensor on a combine have been provided according to embodiments of the present invention. Example physics-based mathematical models that express the relationship between the rate of mass flow through the combine and the measured time-averaged force imparted to the impact plate in terms of mechanical properties of the grains and the interior geometry of the combine have also been provided. Further provided are example computational methods that implement the mathematical model and allows for prediction of the time-averaged force imparted to the impact plate, given parameter values describing the grain properties, the combine geometry, and an input rate of mass flow. For example, a nonlinear regression algorithm is provided according to example embodiments of the present invention that allow for the estimation of model parameters for known combine geometry and pairs of rates of mass flow and measured time-averaged force. Also provided is a method of inducing known changes to measurable parameters (such as the impact plate 30 orientation) as a way to self-calibrate the sensor system.

It will be appreciated that other methods and systems to modify measurable parameters may be provided according to embodiments of the present invention. For example, the impact plate 30 can be moved along a horizontal and/or vertical plane to change the mass flow sensor geometry. Alternatively, the rate at which solid particles are deposited can be intentionally varied by, for instance, varying the rotation frequency of the sprocket 29. Preferred methods vary measurable parameters for which the thing that one can measure (e.g., momentum imparted to the impact sensor) exhibits a significant dependence and that can be intentionally varied while maintaining other measurable parameters to be substantially constant.

Embodiments of the present invention remedy issues associated with initial calibration of conventional impact-based mass flow sensors. By contrast, in conventional impact-based mass flow sensor systems, real-time mass flow rate estimation is accomplished by relating the sensor output to the polynomial curve developed in the calibration procedure. Thus, when harvesting conditions change, the current calibration curve is no longer representative of those changes, likely leading to incorrect mass flow rate estimates. At that time, the need for calibration must be recognized by the combine operator, and the calibration procedure must again be performed, at the cost of additional time and effort.

Preferred embodiments of the present invention remove the requirement of the combine operator to recognize the need for calibration as well as the burden of performing that manual calibration. Instead, automated sweeps of various impact plate orientations can continuously and automatically calibrate the system by updating the parameters of the model that relate the sensor output, impact plate orientation, and mass flow rate. Combining this method with an accurate and reliable model of the relationship between measurable and internal parameters provides sufficient statistical certainty in order to be able to infer the values of the unknown mass flow rate, while continuously updating the values of internal parameters representing grain interaction properties so as to accommodate variable grain and operating conditions. Example systems remedy the need for frequent, manual calibration of mass flow sensor systems on combines to facilitate increased accuracy, long-term reliability, and ease-of-use of such systems. Example embodiments further provide the possibility of initial calibration against sensor measurements taken with a single known mass flow rate.

Example embodiments can also provide an improvement to existing mass flow sensor systems. Alterations can be provided to an existing combine, clean grain elevator system, or mass flow system to improve the process of calibration and estimation. Such alterations can include, but are not limited to, enabling controlled variations in internal machine geometry and kinematics, such as the impact plate orientation, and the application via the configured processor of a nonlinear regression algorithm to a model of the input-output relationship. Embodiments of the present invention also provide a combine including a mass flow sensor as provided herein.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method of calibrating a mass flow sensor in a machine, the machine including a housing, a mass flow system to move solid particles and propel particles through a path toward a portion of the housing, the mass flow sensor disposed to determine a mass of particles propelled through the path toward a portion of the housing and generate a corresponding sensor output, and an actuator to adjust at least one measurable parameter of the mass flow sensor to affect the sensor output, and a processor to receive the sensor output and control the actuator, the method comprising:

by the processor, applying a model relating a mass flow input to the sensor output, the model including at least one internal parameter and the at least one measurable parameter;

by the actuator, varying the at least one measurable parameter over a plurality of samples;

by the processor, for each of the plurality of samples, receiving the generated sensor output;

by the processor, measuring a mass flow input for mass flow that occurs while conducting said varying; and by the processor, updating the model by updating the at least one internal parameter in said model based on the mass flow input for each of the plurality of samples, the received sensor output for each of the plurality of samples, and the varied measurable parameter for each of the plurality of samples.

2. The method of claim 1, wherein said receiving provides a set of data for each of the plurality of samples.

3. The method of claim 1, wherein said updating comprises:
performing a nonlinear regression analysis on said model using the mass flow input for each of the plurality of samples to optimize the internal parameters.

4. The method of claim 3, wherein said performing a nonlinear regression analysis comprises executing a least-squares function.

5. The method of claim 1, wherein the solid particles comprise grain.

6. The method of claim 1, wherein the internal parameters comprises parameters representing at least one characteristic taken from the group consisting of: mechanical interactions among the solid particles, mechanical interactions between the solid particles and portions of the mass flow sensor, frictional properties of the solid particles, adhesive properties of the solid particles, elastic properties of the solid particles, visco-elastic properties of the solid particles, collisional properties of the solid particles, moisture content of the solid particles, shape of the solid particles, density of the solid particles, and unknown deformations in the geometry of the mass flow system due to aging.

7. The method of claim 6, wherein the model further comprises at least one measurable parameter representing at least one characteristic taken from the group consisting of: kinematics of the mass flow system and geometry of the mass flow system.

8. The method of claim 7, wherein the model comprises a physical mathematical model describing particle flow.

9. The method of claim 1, wherein the machine comprises a combine and the measurable parameter comprises an internal geometry of a portion of the combine.

10. The method of claim 9, wherein the mass flow sensor comprises an impact sensor and the measurable parameter comprises an angle position of the impact sensor;
wherein said varying the measurable parameter comprises changing the angle position of the impact sensor.

11. The method of claim 10, wherein the impact sensor comprises an impact plate that is contacted by the solid particles to generate the received impact force, said impact plate being coupled to an actuator;
wherein said varying the measurable parameter comprises operating the actuator to change the angle position of the impact plate.

12. The method of claim 1, wherein the mass flow sensor comprises an impact sensor that receives an impact force due to collisions with a plurality of the solid particles as the solid particles flow through the mass flow sensor to generate a sensor output, the method further comprising:

applying an updated model determined after said updating;
receiving a new generated sensor output; and
estimating the mass flow using said updated model and said received new generated sensor output.

13. The method of claim 12, wherein said estimating comprises:
performing a bisection algorithm on said updated model using the generated new sensor output to solve for the estimated mass flow.

14. The method of claim 12, wherein the solid particles comprise grain.

15. A method of calibrating a mass flow sensor in a machine, the machine including a housing, a mass flow system configured to move solid particles and propel particles through a path toward a portion of the housing, the mass flow sensor disposed to determine a mass of particles propelled through the path toward a portion of the housing and generate a corresponding sensor output, and an actuator to adjust at least one measurable parameter of the mass flow sensor to affect the sensor output, and a processor to receive the sensor output and control the actuator, the method comprising:
by the processor, applying a model relating a mass flow input to the sensor output, the model including at least one internal parameter and the at least one measurable parameter;
by the actuator, varying the measurable parameter over a plurality of samples;
by the processor, for each of the plurality of samples, receiving the generated sensor output;
by the processor, estimating a mass flow input using said model, said varied measurable parameter for each of the plurality of samples, and said received sensor output for each of the plurality of samples; and
updating the model by updating the at least one internal parameter in said model based on the estimated mass flow input, the received sensor output for each of the plurality of samples, and the varied measurable parameter for each of the plurality of samples.

16. The method of claim 15, wherein said updating updates the model and estimates said mass flow input simultaneously.

17. The method of claim 15, wherein the at least one internal parameter before said updating is derived from an earlier calibration.

18. The method of claim 15, wherein said varied measurable parameter and said receiving the sensor output over the plurality of samples provide a set of data for each of the plurality of samples, each set of data comprising the varied measurable parameter and said received sensor output.

19. The method of claim 18, wherein said estimating comprises performing a nonlinear regression analysis on said model using the provided sets of data to optimize the estimated mass flow input; and
wherein said updating comprises performing a nonlinear regression analysis on said model using the provided sets of data to optimize the internal parameters.

20. The method of claim 19, wherein said performing a nonlinear regression analysis comprises executing a least-squares function.

21. The method of claim 15, wherein the solid particles comprise grain.

22. The method of claim 21, wherein the internal parameters comprises parameters representing at least one characteristic taken from the group consisting of: mechanical interactions among the solid particles, mechanical interactions between the solid particles and portions of the mass flow sensor, frictional properties of the solid particles, adhesive properties of the solid particles, elastic properties of the solid particles, visco-elastic properties of the solid particles, collisional properties of the solid particles, moisture content of the solid particles, shape of the solid particles, density of the solid particles, and unknown deformations in the geometry of the mass flow system due to aging.

23. The method of claim 22, wherein the model further comprises at least one measurable parameter representing at least one characteristic taken from the group consisting of: kinematics of the mass flow system and geometry of the mass flow system.

24. The method of claim 23, wherein the model comprises a physical model describing solid particle flow.

25. The method of claim 15, wherein the machine comprises a combine, and the measurable parameter comprises an internal geometry of a portion of the combine.

26. The method of claim 25, wherein the mass flow sensor comprises an impact sensor, and the measurable parameter comprises an angle position of the impact sensor;
wherein said varying the measurable parameter comprises changing the angle position of the impact sensor.

27. The method of claim 26, wherein the impact sensor comprises an impact plate that is contacted by the solid particles to generate the received impact force, said impact plate being coupled to the actuator;
wherein said varying the measurable parameter comprises operating the actuator to change the angle position of the impact plate.

28. The method of claim 15, wherein the mass flow sensor comprises an impact sensor that receives an impact force due to collisions with a plurality of the solid particles as the solid particles flow through the mass flow sensor to generate a sensor output, the method comprising:
applying an updated model determined after said updating;
receiving the new generated sensor output; and
estimating the mass flow using said updated model and said received new generated sensor output.

29. The method of claim 28, wherein said estimating comprises:
performing a bisection algorithm on said updated model using the generated new sensor output to solve for the estimated mass flow.

30. The method of claim 29, wherein the solid particles comprise grain.

31. The method of claim 28, wherein the model comprises a physical model describing solid particle flow.

32. For a combine comprising a housing, an input to the housing having an input path, and a clean grain elevator at least partly disposed in the input path for receiving, delivering, and propelling grain through a portion of the housing, a mass flow sensor for sensing a mass flow of the grain comprising:
an impact sensor disposed relative to the grain elevator and configured to receive impact due to collisions with a plurality of particles of the propelled grain and generate a sensor output;
a selectively operable actuator coupled to said impact plate for controlling a relative position of said impact sensor and the grain elevator; and
a processor coupled to said impact sensor for receiving the generated sensor output;
said processor being configured to determine the mass flow of the grain based on a model relating the generated sensor output and the mass flow, said processor being further configured to calibrate the model.

33. The mass flow sensor of claim 32
wherein said impact sensor comprises an impact plate mounted to the housing; and
wherein said actuator controls a mounting angle of said impact plate.

34. The mass flow sensor of claim 32, wherein said processor is configured to:
apply a model relating a mass flow input to the sensor output, the model including at least one internal parameter and at least one measurable parameter;
vary the measurable parameter over a plurality of samples, said varying comprising controlling a physical component of the mass flow sensor;
for each of the plurality of samples, receive the generated sensor output;
measure a mass flow input for mass flow that occurs while conducting said varying; and
update the model by updating the at least one internal parameter in said model based on the provided mass flow input for each of the plurality of samples, the received sensor output for each of the plurality of samples, and the varied measurable parameter for each of the plurality of samples.

35. The mass flow sensor of claim 32, wherein said processor is configured to:
apply a model relating a mass flow input to the sensor output, the model including at least one internal parameter and at least one measurable parameter;
vary the measurable parameter over a plurality of samples, said varying comprising operating the actuator;
for each of the plurality of samples, receive the generated sensor output;
estimate a mass flow input using said model and said received generated sensor output; and
update the model by updating the at least one internal parameter in said model based on the estimated mass flow input, the received sensor output for each of the plurality of samples, and the varied measurable parameter for each of the plurality of samples.

36. The mass flow sensor of claim 35, wherein said processor is configured to:
receiving the generated sensor output; and
estimate the mass flow using said updated model and said received generated sensor output.

37. A combine comprising:
a housing;
a clean grain elevator configured to move grain and propel grain through a path toward a portion of the housing;
a mass flow sensor disposed to determine a mass of particles propelled through the path toward a portion of the housing and generate a corresponding sensor output;
an actuator to adjust a measurable parameter of the mass flow sensor to affect the sensor output; and
a processor that receives the generated sensor output and controls said actuator, said processor obtaining a plurality of sensor output samples corresponding to a plurality of adjusted values of the measurable parameter;
said processor being configured to determine the mass flow of the grain based on a model relating the generated sensor output and the mass flow, said processor being further configured to calibrate the model based upon the sensor output samples corresponding to the plurality of adjusted values of the measurable parameter.

* * * * *